United States Patent
Kim et al.

(10) Patent No.: US 10,149,221 B2
(45) Date of Patent: Dec. 4, 2018

(54) METHOD AND APPARATUS FOR PERFORMING OPERATION RELATED TO RADIO LINK FAILURE IN A HETEROGENEOUS NETWORK

(71) Applicant: LG ELECTRONICS INC., Seoul (KR)

(72) Inventors: Sangwon Kim, Seoul (KR); Youngdae Lee, Seoul (KR); Sunghoon Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 125 days.

(21) Appl. No.: 14/910,481

(22) PCT Filed: Jul. 17, 2014

(86) PCT No.: PCT/KR2014/006488
§ 371 (c)(1),
(2) Date: Feb. 5, 2016

(87) PCT Pub. No.: WO2015/020321
PCT Pub. Date: Feb. 12, 2015

(65) Prior Publication Data
US 2016/0192269 A1 Jun. 30, 2016

Related U.S. Application Data

(60) Provisional application No. 61/863,441, filed on Aug. 8, 2013.

(51) Int. Cl.
*H04W 36/30* (2009.01)
*H04W 36/00* (2009.01)
(Continued)

(52) U.S. Cl.
CPC .......... *H04W 36/30* (2013.01); *H04W 24/10* (2013.01); *H04W 36/0072* (2013.01); *H04W 36/0083* (2013.01); *H04W 36/04* (2013.01)

(58) Field of Classification Search
CPC ............. H04W 36/30; H04W 36/0072; H04W 36/0083; H04W 36/04; H04W 24/10
See application file for complete search history.

(56) References Cited

U.S. PATENT DOCUMENTS

2010/0329211 A1 12/2010 Ou
2011/0081904 A1* 4/2011 Kuo .................... H04W 76/027
455/425

(Continued)

OTHER PUBLICATIONS

Alcatel-Lucent, Alcatel-Lucent Shanghai Bell: "Reduce Service Interruption Time with Adaptive RLF Trigger in HetNets", 3GPP TSG RAN WG2 Meeting #82, R2-132027, May 20-24, 2013.

*Primary Examiner* — Ian N Moore
*Assistant Examiner* — Ronald h Davis
(74) *Attorney, Agent, or Firm* — Dentons US LLP

(57) ABSTRACT

The present disclosure relates to a terminal operation method related to radio link failure (RLF) in a heterogeneous network, the method comprising: measuring a quality of a serving cell using a reference signal (RS) received from a serving base station; checking whether consecutive out-of-sync indications are received a predetermined number on a physical layer channel; and running a timer related to the RLF when the consecutive out-of-sync indications are received the predetermined number on the physical layer channel, wherein the timer is scaled when a timer scaling condition is met.

9 Claims, 18 Drawing Sheets

(51) Int. Cl.
*H04W 24/10* (2009.01)
*H04W 36/04* (2009.01)

(56) References Cited

U.S. PATENT DOCUMENTS

| | | | |
|---|---|---|---|
| 2012/0207040 A1* | 8/2012 | Comsa | H04W 72/1215 370/252 |
| 2013/0095818 A1 | 4/2013 | Levy et al. | |
| 2013/0182563 A1* | 7/2013 | Johansson | H04W 76/027 370/228 |
| 2014/0146794 A1* | 5/2014 | Dalsgaard | H04W 8/02 370/332 |
| 2015/0271763 A1* | 9/2015 | Balachandran | H04W 52/245 370/338 |

* cited by examiner

[Figure 1]
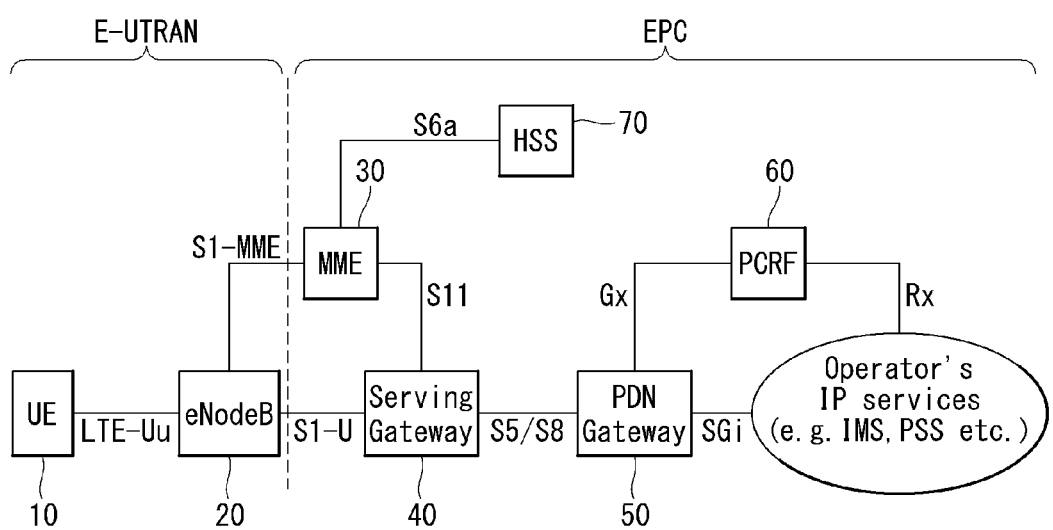

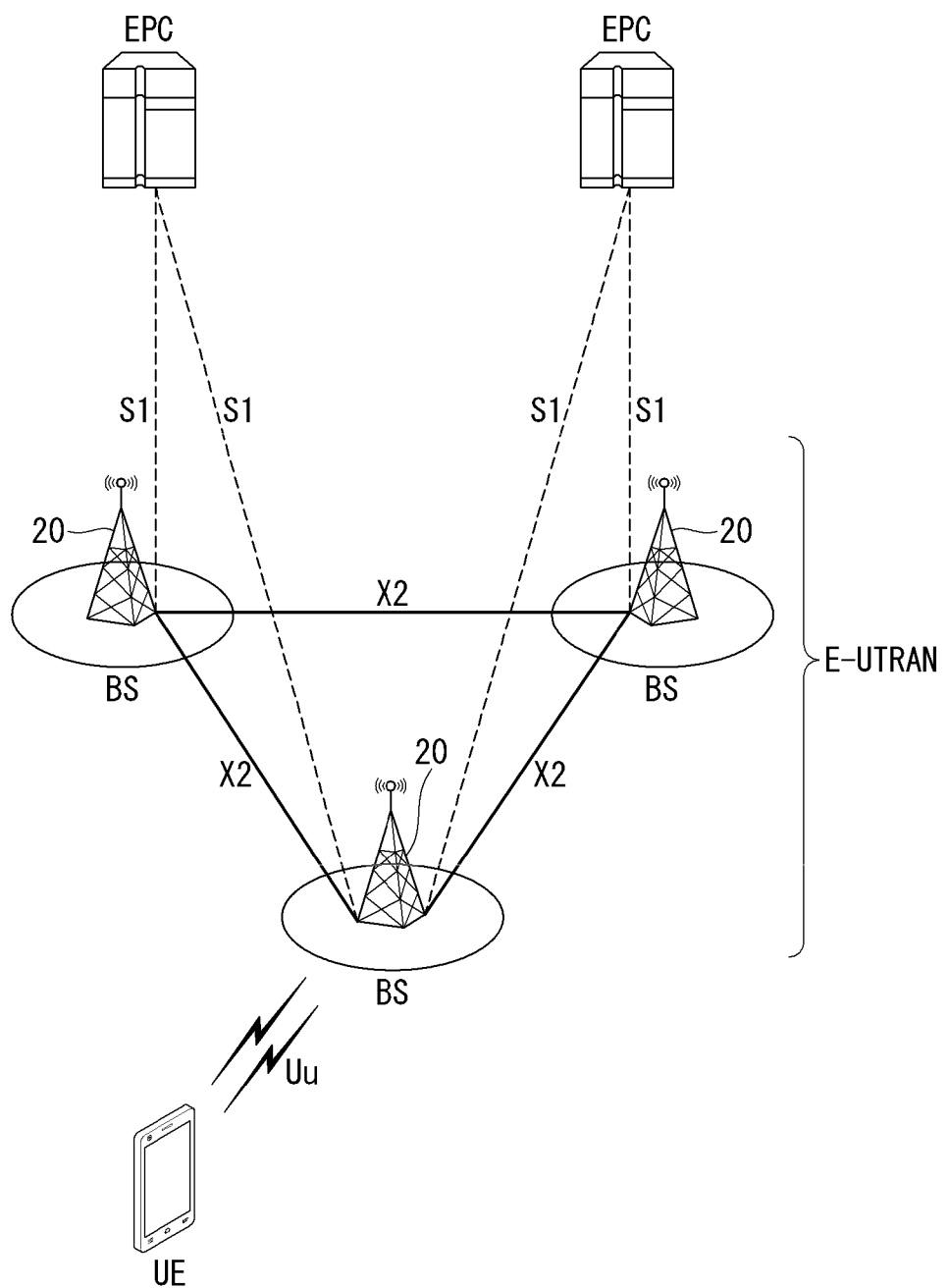
[Figure 2]

[Figure 3]
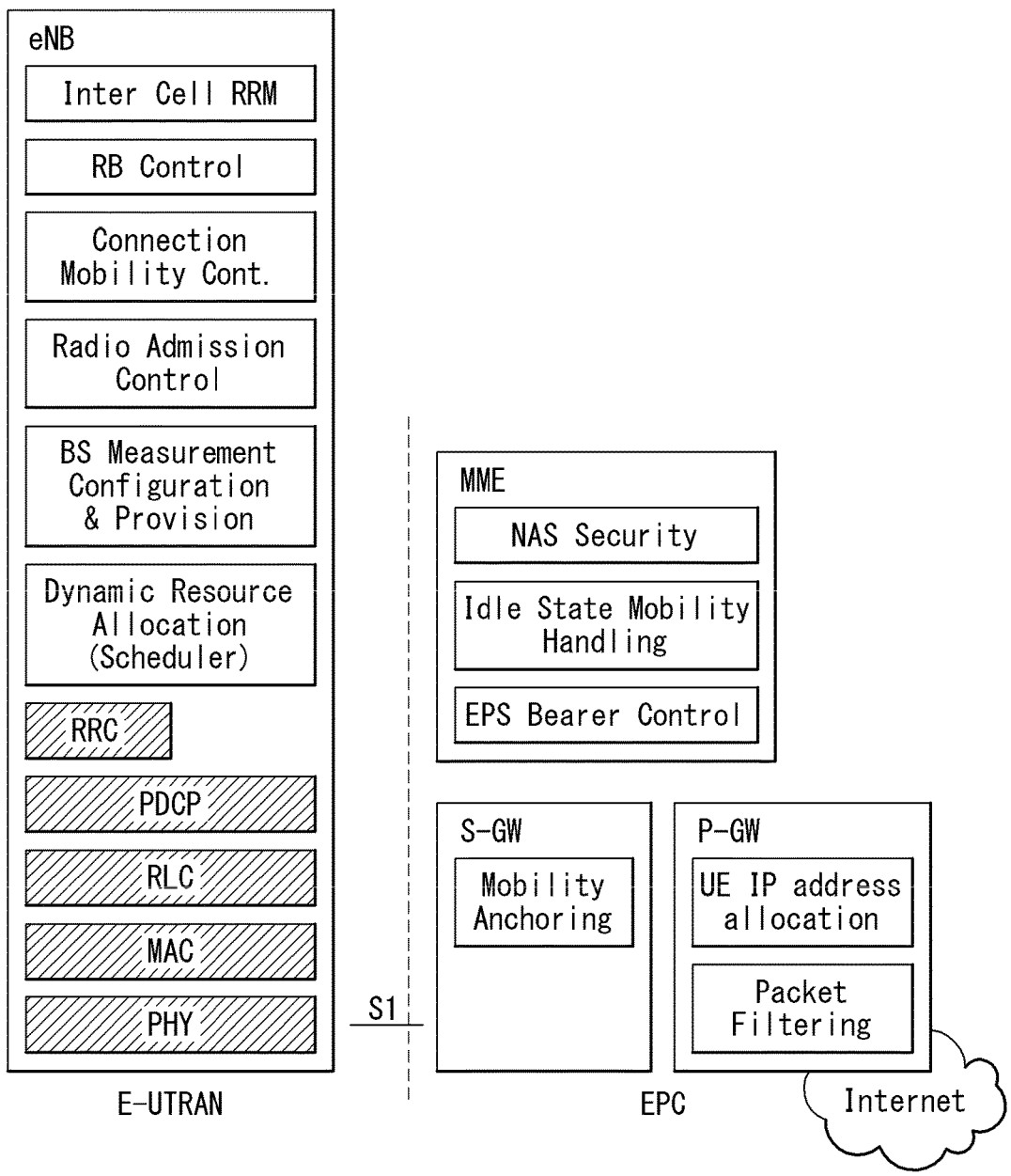

[Figure 4]
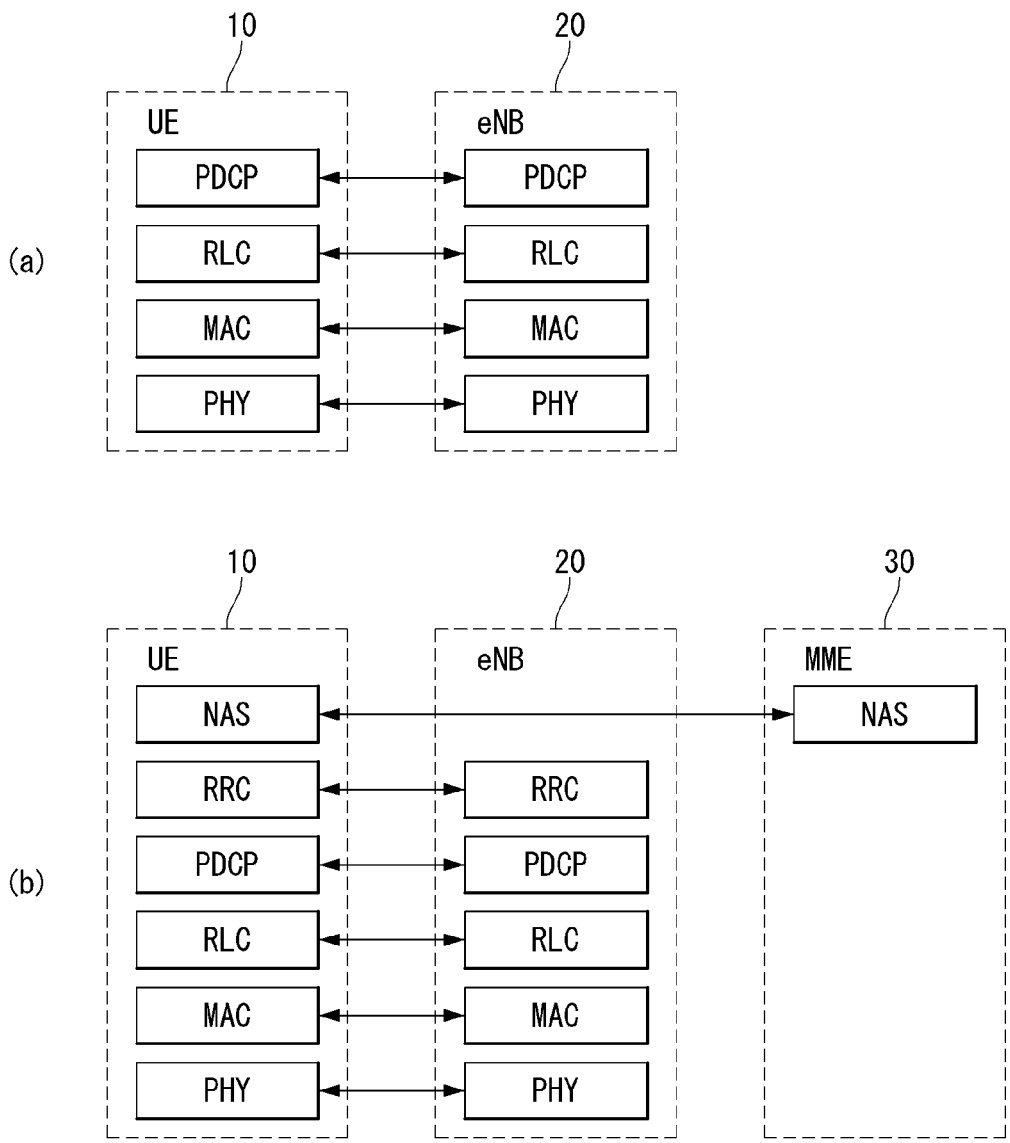

【Figure 5】
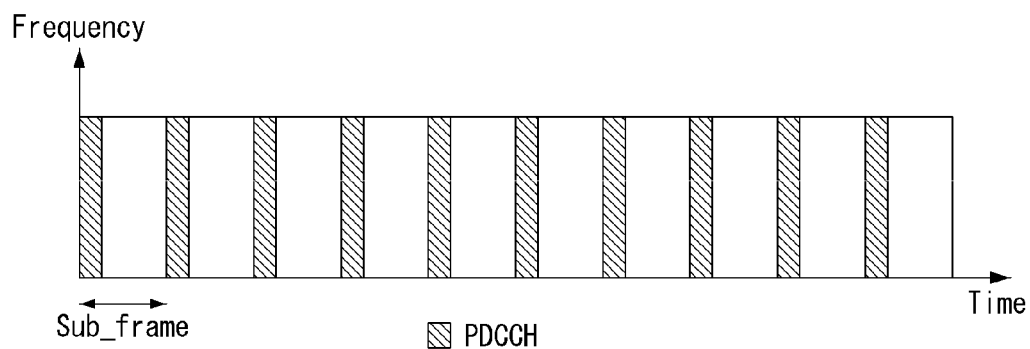
【Figure 6】
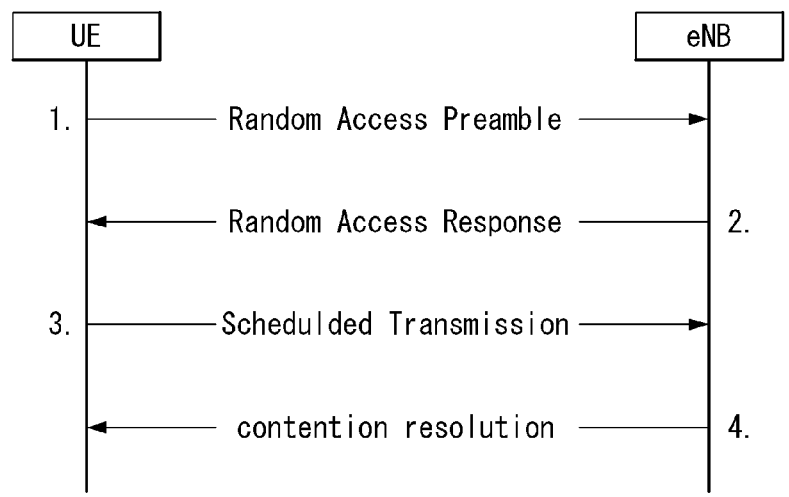

[Figure 7]
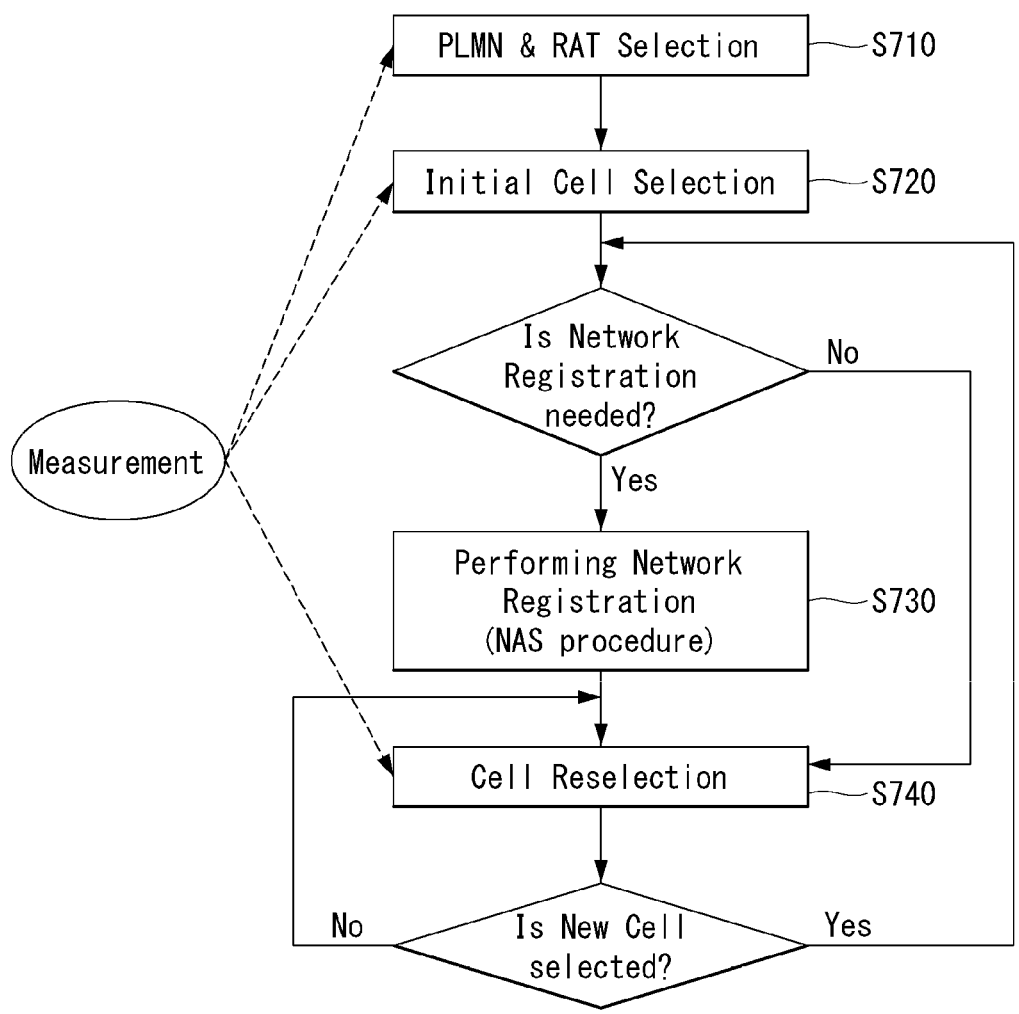

[Figure 8]
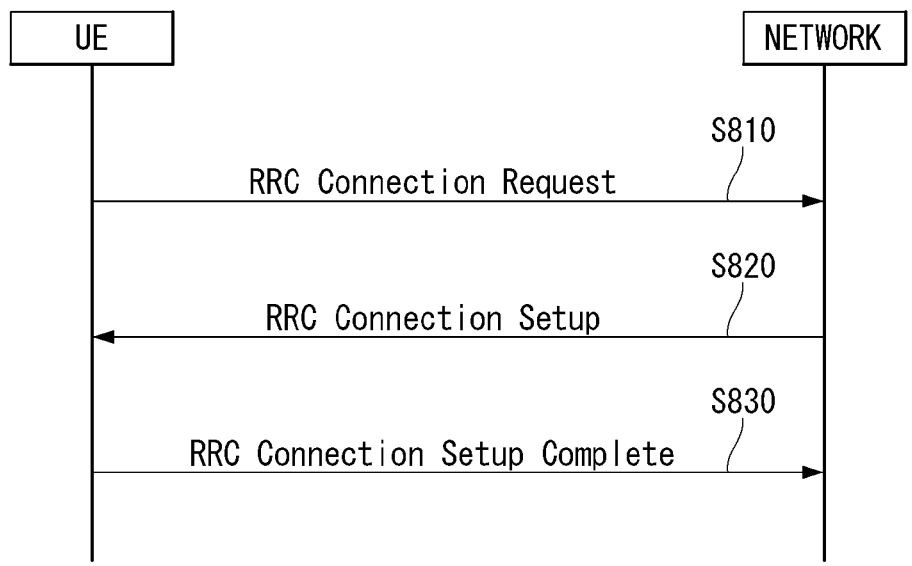
[Figure 9]
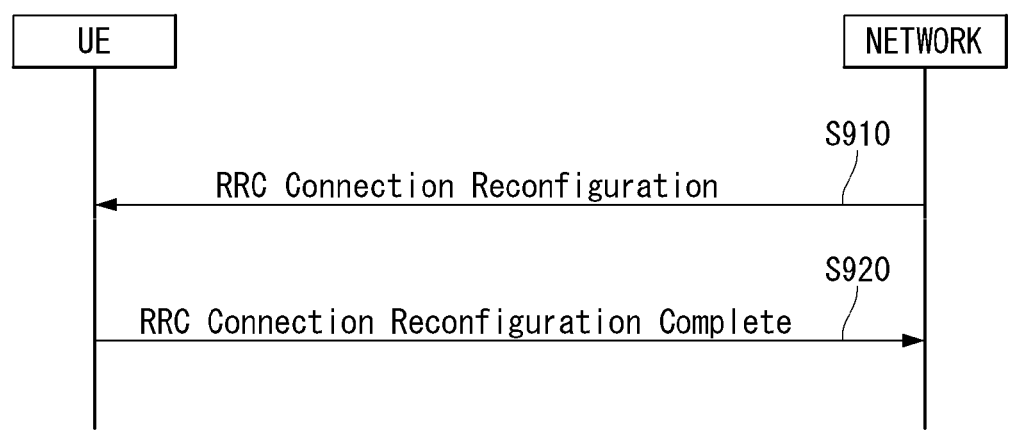

[Figure 10]
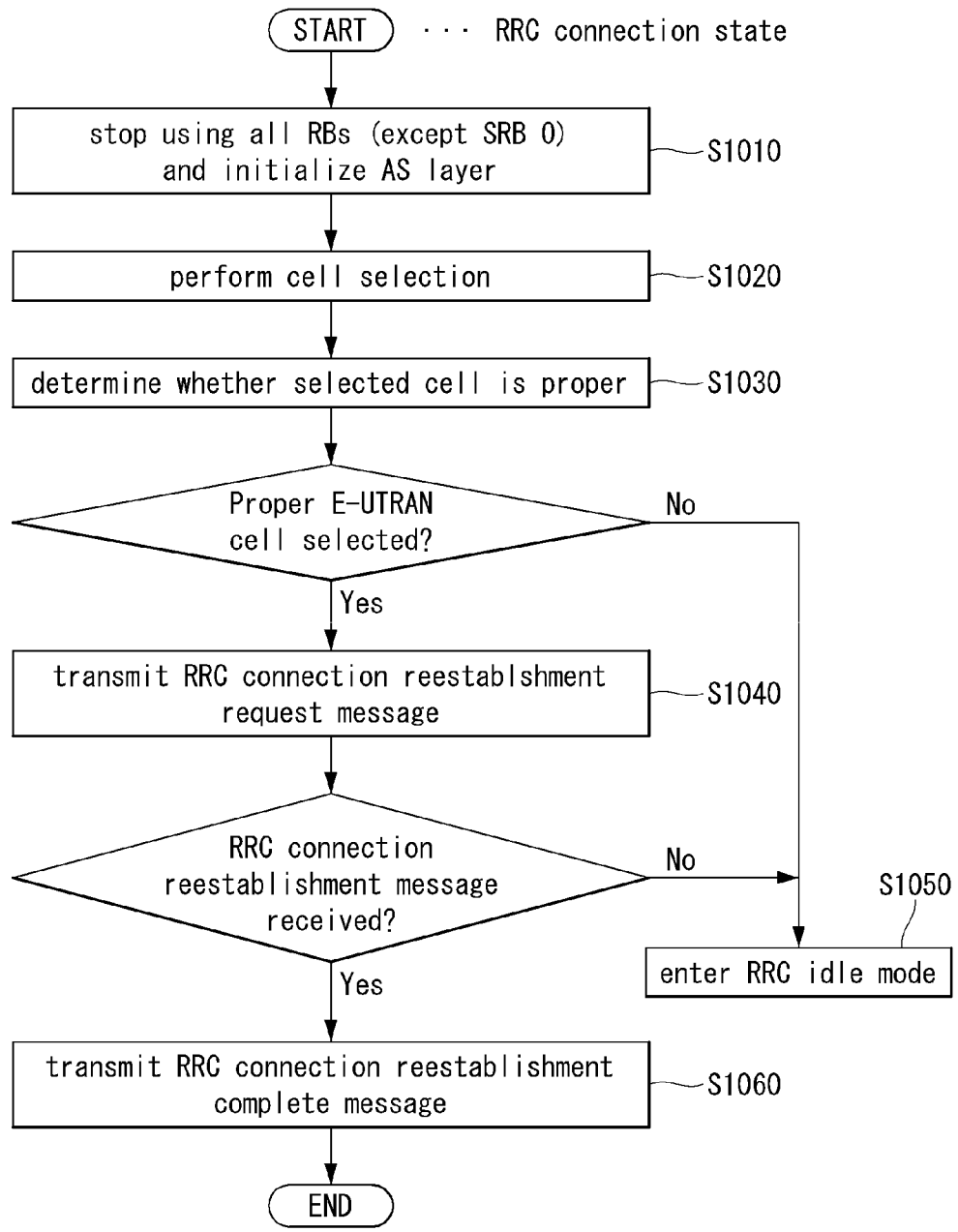

【Figure 11】
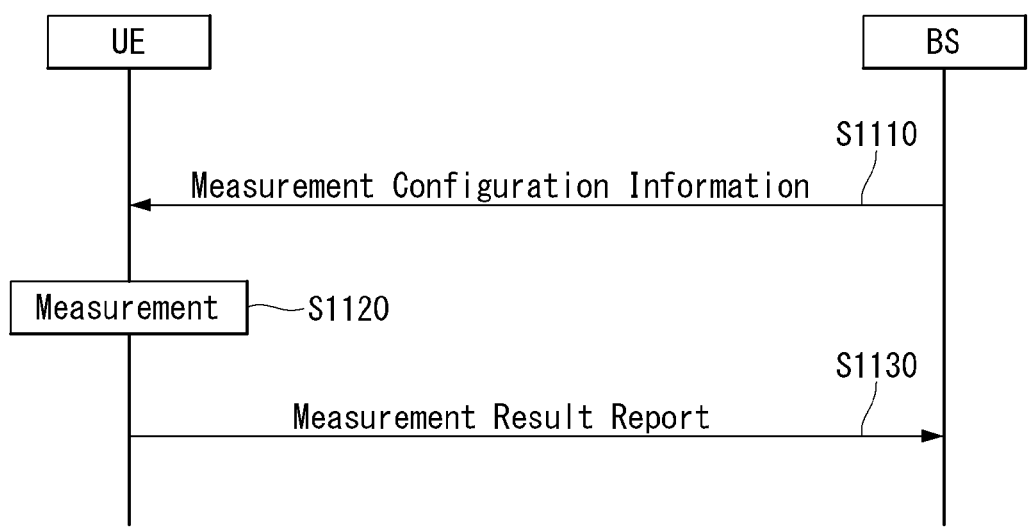

[Figure 12]
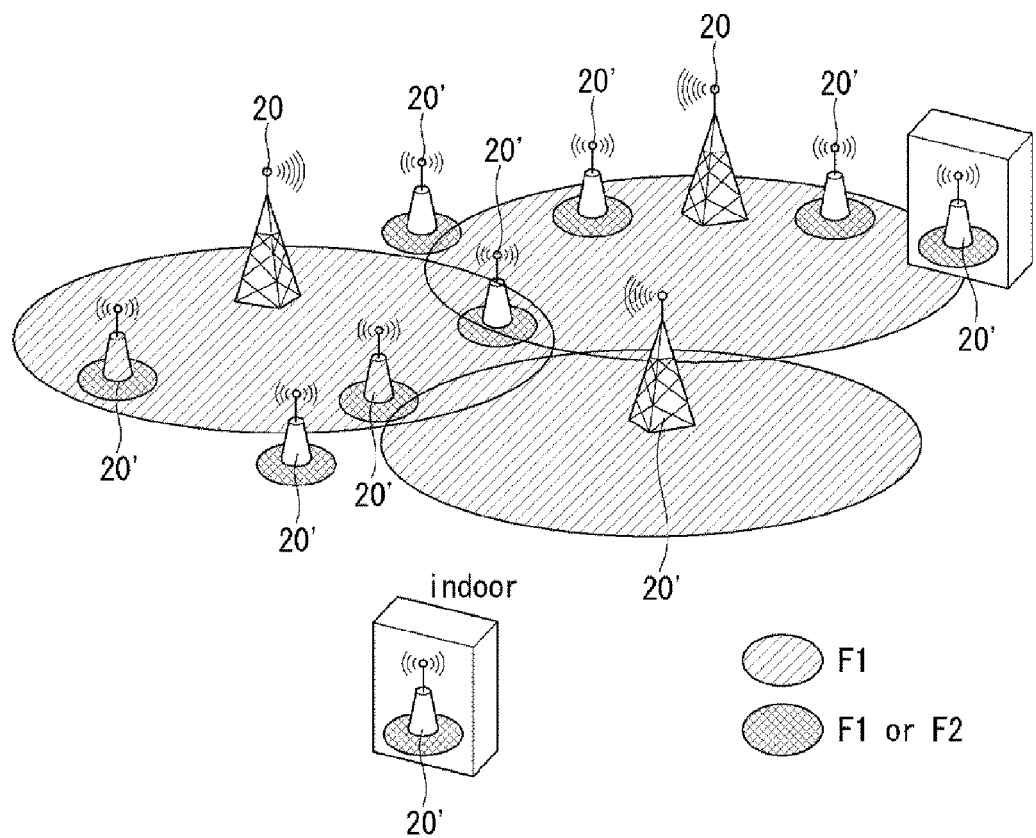

【Figure 13】
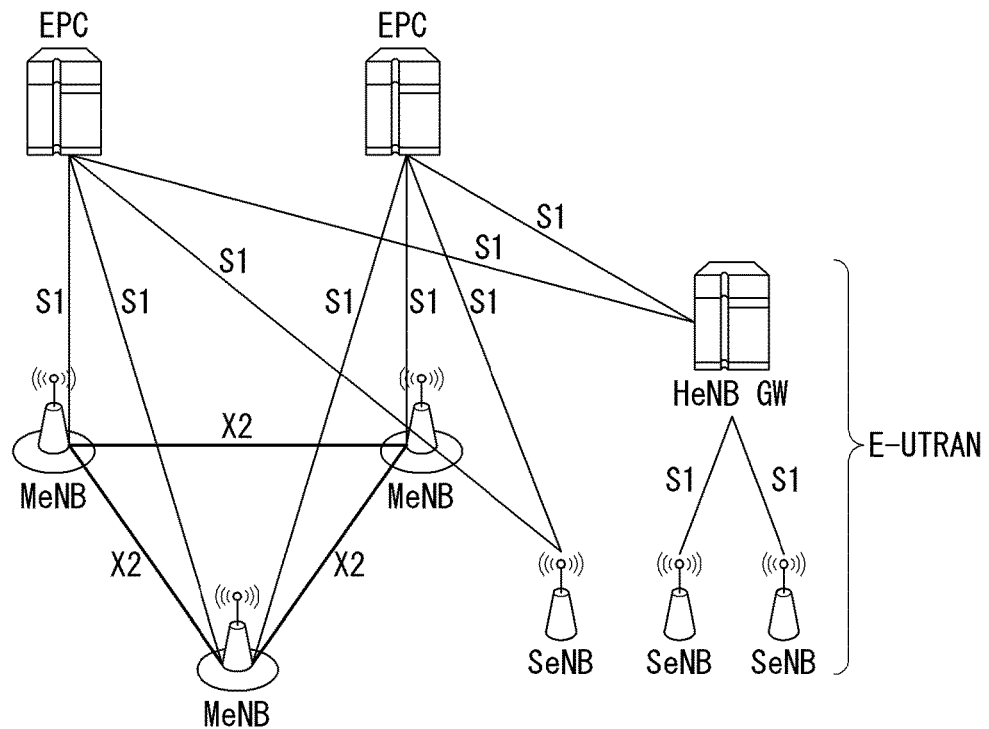
【Figure 14】
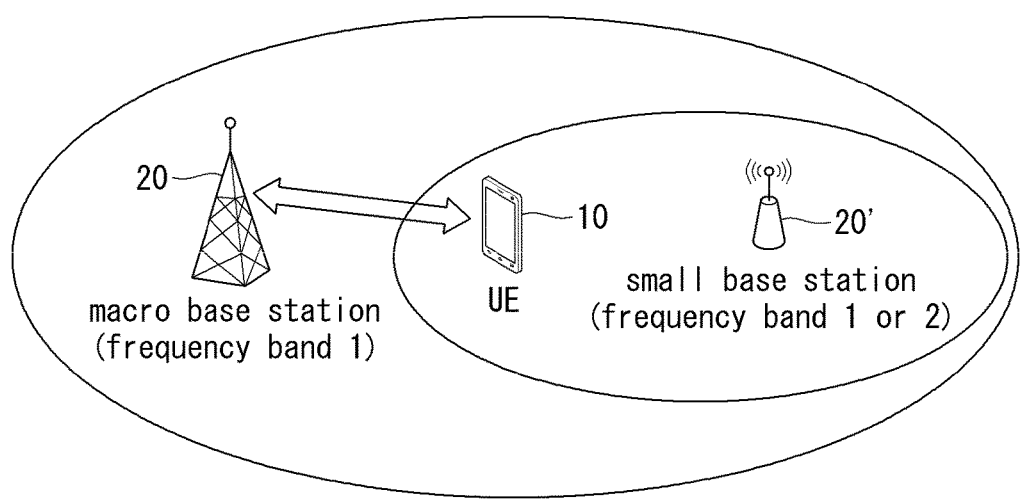

[Figure 15]
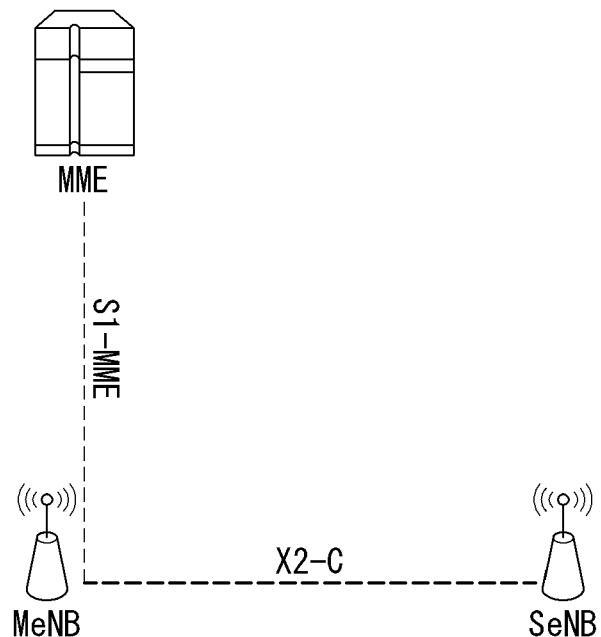
[Figure 16]
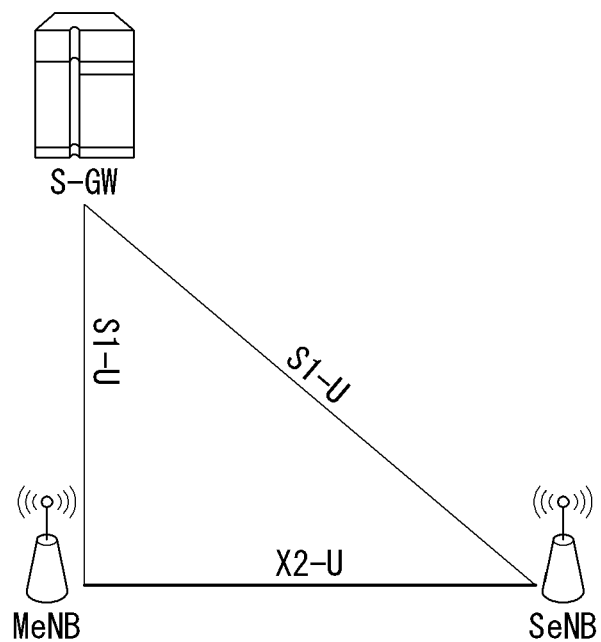

【Figure 17】
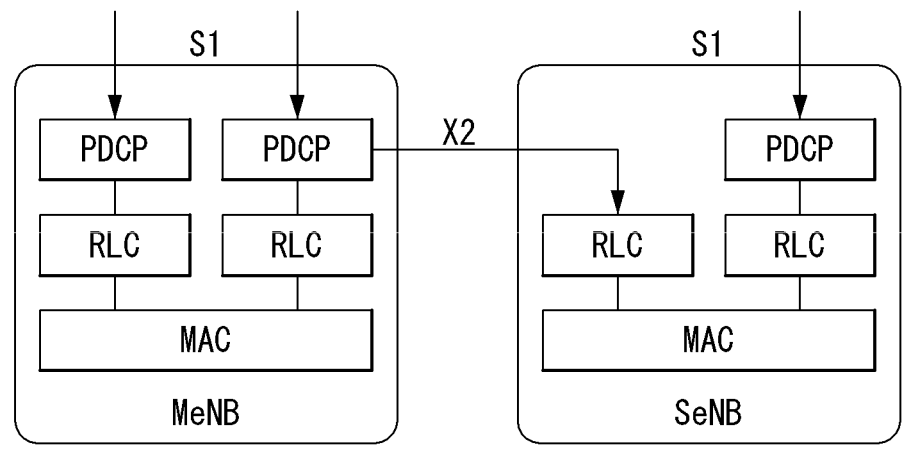
【Figure 18】
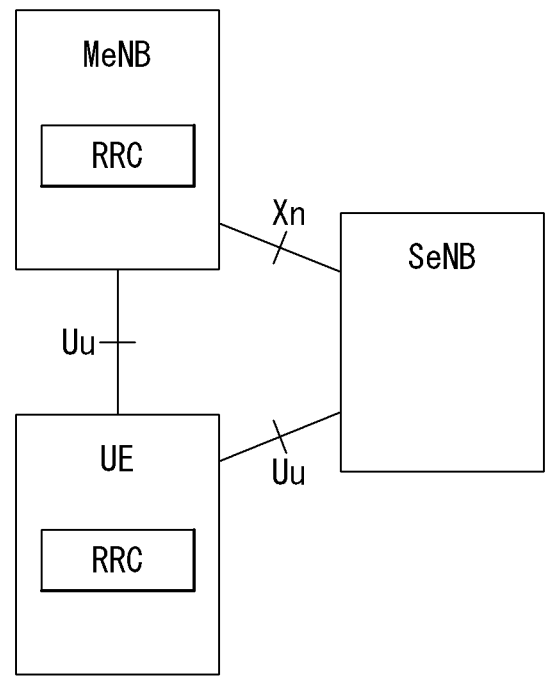

【Figure 19】
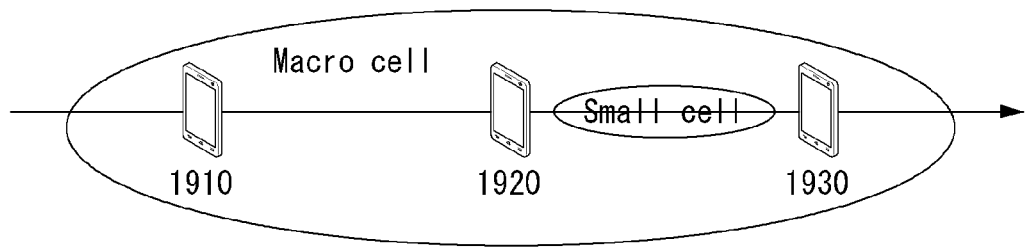
【Figure 20】
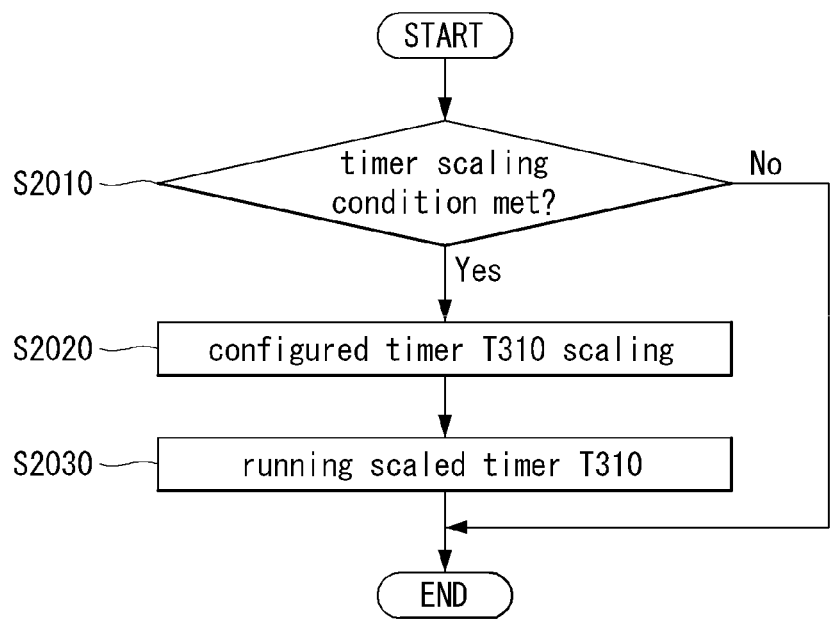

[Figure 21]
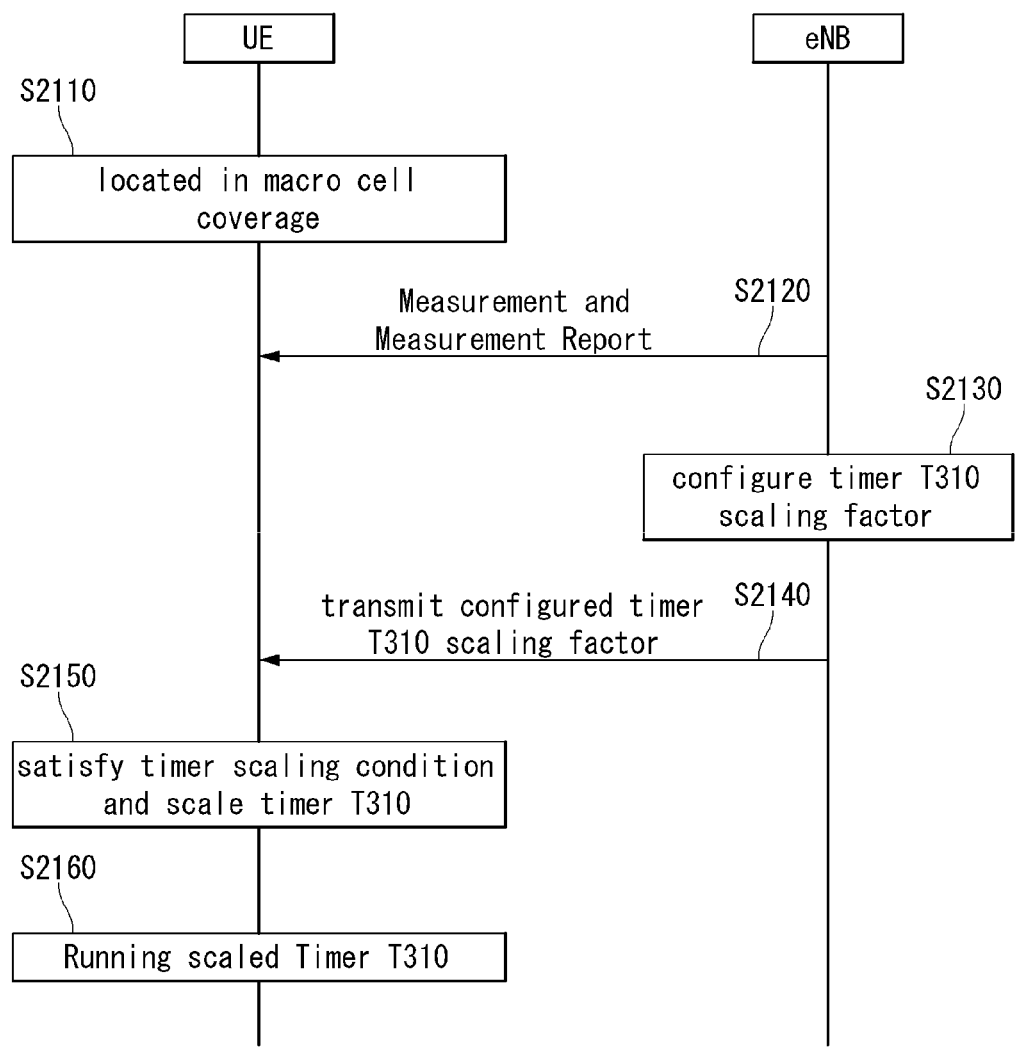

【Figure 22】
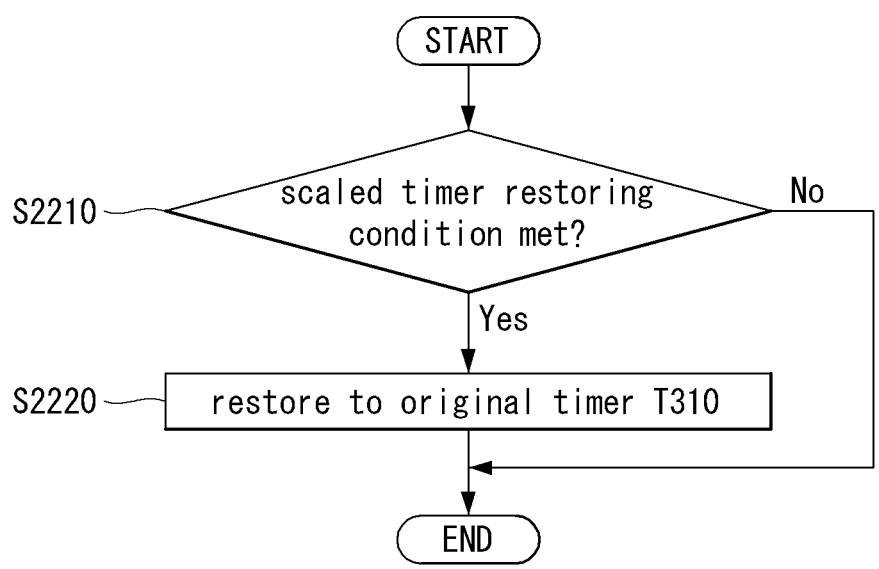

[Figure 23]
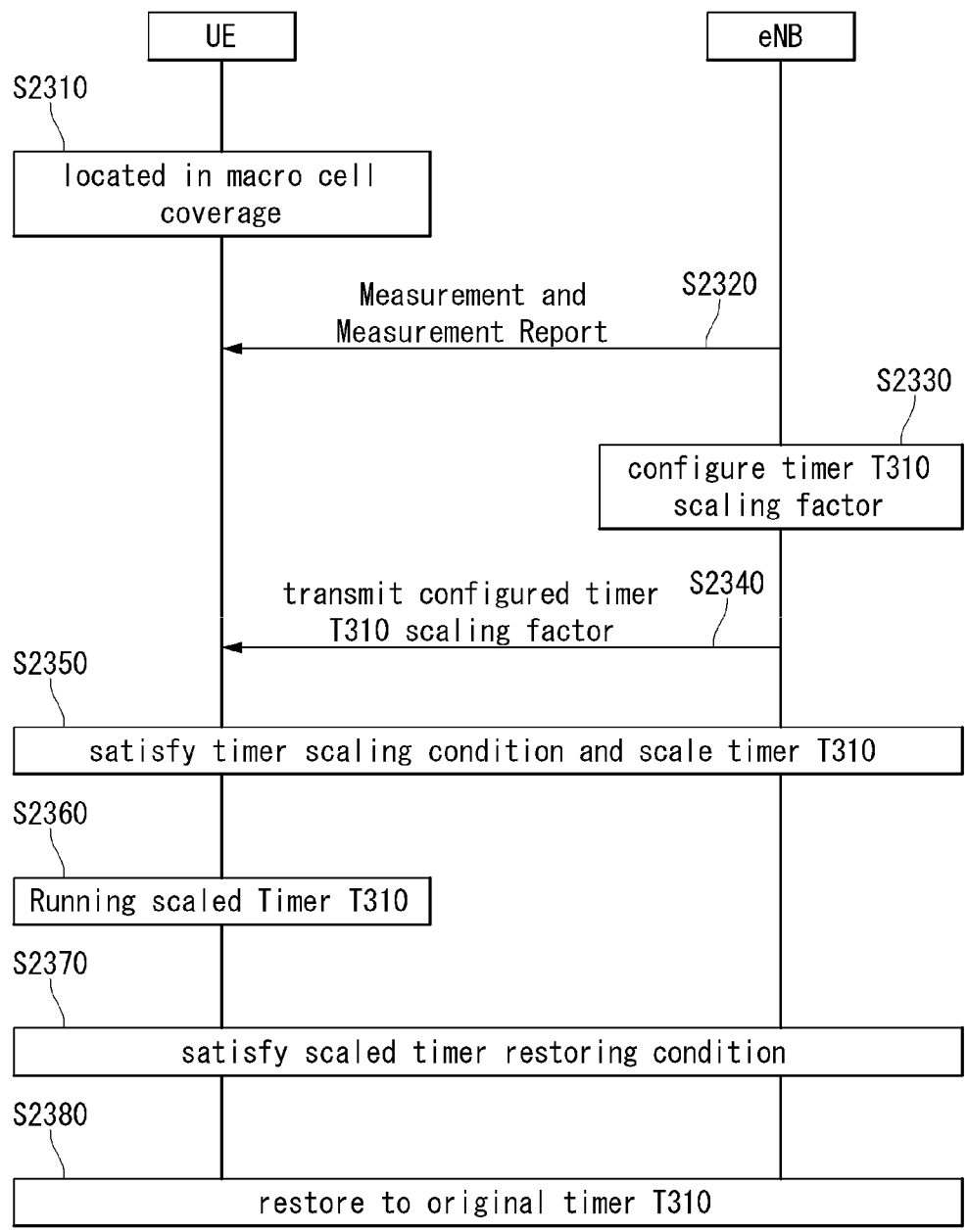

【Figure 24】
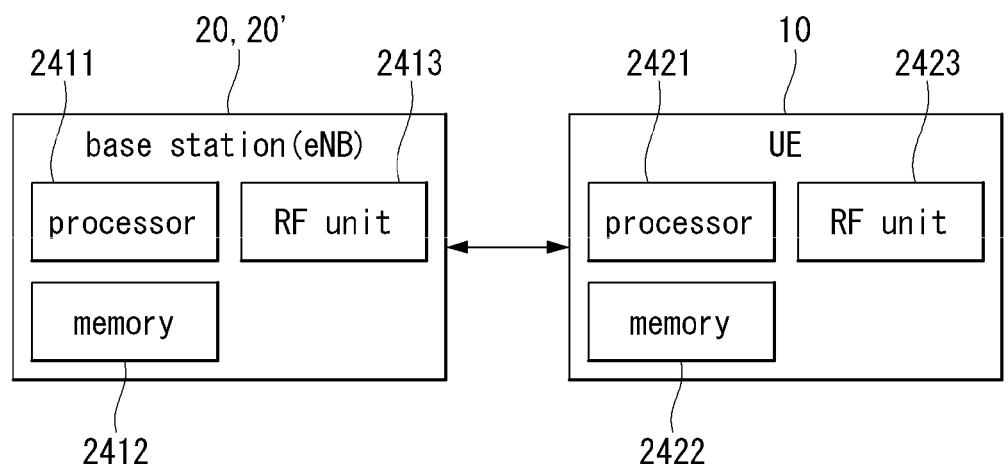

METHOD AND APPARATUS FOR PERFORMING OPERATION RELATED TO RADIO LINK FAILURE IN A HETEROGENEOUS NETWORK

This application is a 35 USC § 371 National Stage entry of International Application No. PCT/KR2014/006488 filed on Jul. 17, 2014, which claims priority to U.S. Provisional Application No. 61/863,441, filed on Aug. 8, 2013, all of which are incorporated by reference in their entirety herein.

TECHNICAL FIELD

This disclosure relates to a method and apparatus for performing operations related to radio link failure (RLF) in a heterogeneous network.

BACKGROUND ART

3GPP (3rd Generation Partnership Project) LTE (Long Term Evolution), which is an advanced version of UMTS (Universal Mobile Telecommunications System) has been introduced as 3GPP release 8. 3GPP LTE adopts OFDMA (Orthogonal Frequency Division Multiple Access) for downlink and SC-FDMA (Single Carrier-Frequency Division Multiple Access) for uplink. MIMO (Multiple Input Multiple Output) having up to four antennas is employed. Recently, 3GPP LTE-A (LTE-Advanced) that is an evolution of 3GPP LTE has been intensively under discussion.

In HetNet, for high speed UEs, their handover failure rate is much higher than that for low speed UEs. In addition, for fast moving UEs, the potential offloading gain obtained from connecting to pico cells is very low because such UE has very short ToS. Therefore, it makes sense to prevent such UEs from performing handover into pico cells.

However, if the high speed UE cannot pass through the pico cell coverage before T310 expires, the UE will declare RLF. Then, the communication interruption time becomes longer because the UE should recovery connection with the serving cell after passing through the pico cell coverage.

SUMMARY OF INVENTION

Technical Problem

Accordingly, an object of this disclosure is to provide a method for preventing terminals moving at fast speed from handing over to small cells such as pico cells.

Further, an object of this disclosure is to provide a method of scaling a timer T310 so that the timer T310 does not expire until a terminal passes through a small cell.

Further, an object of this disclosure is to provide a method of recovering the scaled timer T310 in case the terminal passes through the small cell.

The technical objects to be achieved in this disclosure are not limited to the forgoing objects, and unmentioned other technical objects will be apparent to one of ordinary skill in the art to which the present invention pertains from the following description.

Technical Solution

According to this disclosure, a terminal operation method related to radio link failure (RLF) in a heterogeneous network, the method comprising: measuring a quality of a serving cell using a reference signal (RS) received from a serving base station; checking whether consecutive out-of-sync indications are received a predetermined number on a physical layer channel; and running a timer related to the RLF when the consecutive out-of-sync indications are received the predetermined number on the physical layer channel, wherein the timer is scaled when a timer scaling condition is met.

Further, in this disclosure, scaling of the timer is multiplying or adding a scaling factor to the timer.

Further, in this disclosure, scaling of the timer uses a separate timer configured in the terminal in addition to the timer.

Further, in this disclosure, the timer is a timer T310.

Further, in this disclosure, the timer scaling condition is a condition when a measurement report triggering condition for a specific target cell is met and the specific target cell is a small cell, when a measurement report triggering condition for the specific target cell is met and the target cell is included in a black list, when a measurement report triggering condition for the specific target cell is met and the target cell is prohibited from transmitting a measurement report by a network, when the terminal is detected to have approached a proximity of a small cell, when the terminal detects a small cell, when the terminal detects a neighboring cell that should apply scaling to a timer T310 in a proximity, or when the terminal detects a neighbor cell that should apply scaling to the timer T310 in a proximity and the quality of a measured cell is not less than a threshold.

Further, in this disclosure, the terminal moves at a threshold speed or faster than a threshold moving state.

Further, in this disclosure, the method further comprising: receiving multiple scaling factors from the network; and selecting any one of the received multiple scaling factors, wherein the any one scaling factor is selected based on at least one of the terminal's speed, a size of the serving cell, or a size of a neighbor cell.

Further, in this disclosure, the method further comprising restoring a scaled timer related to the RLF to the timer when the scaled timer restoring condition is met.

Further, in this disclosure, the scaled timer restoring condition is a condition when the scaled timer expires, when the timer scaling condition is not met any longer, or when a measured RSRP (Reference Signal Received Power)/RSRQ (Reference Signal Received Quality) of a target cell triggered so that the timer is scaled is lower than a threshold.

According to this disclosure, a terminal operating in a heterogeneous network, the terminal comprising: a communication unit transceiving a radio signal with an outside; and a processor operationally coupled with the communication unit, wherein the processor is configured to: measure a quality of a serving cell using a reference signal received from a serving base station; check whether consecutive out-of-sync indications are received a predetermined number on a physical layer channel; and run a timer related to the RLF when the consecutive out-of-sync indications are received the predetermined number on the physical layer channel, wherein the timer is scaled when a timer scaling condition is met.

Further, in this disclosure, the processor is configured to control the communication unit to receive multiple scaling factors from a network and to perform control to select any one of the multiple scaling factors received, wherein the selection of any one scaling factor is performed considering at least one of the terminal's speed, a size of the serving cell, or a size of a neighbor cell.

Advantageous Effects

In this disclosure, a terminal is prevented from unnecessarily handing over to a cell from which no service is provided, so that delay time of a data service may be reduced and resources may be utilized more efficiently.

In this disclosure, further, when a terminal passes through a small cell, the timer T310 is scaled not to expire, thus reducing communication interference time required for the terminal to recover communication with a serving cell.

The effects achievable in this disclosure are not limited to the foregoing, and other unmentioned effects are apparent to one of ordinary skill in the art to which the present invention pertains from the following description.

DESCRIPTION OF DRAWINGS

FIG. 1 is a view illustrating an Evolved Packet System which is associated with the Long Term Evolution (LTE) system to which the present invention can be applied.

FIG. 2 illustrates a wireless communication system to which the present invention is applied.

FIG. 3 illustrates a functional split of an E-UTRAN and an EPC to which the present invention can be applied.

FIG. 4A is a diagram illustrating a radio protocol architecture for a user plane. FIG. 4B is a diagram illustrating a radio protocol architecture for a control plane.

FIG. 5 illustrates a structure of a physical channel to which the present invention can be applied.

FIG. 6 is a diagram for an operation process between a terminal and a base station in a contention based random access procedure.

FIG. 7 is a flowchart showing an operation of a UE in RRC_IDLE state to which the present invention can be applied.

FIG. 8 is a flowchart showing an RRC connection establishment procedure to which the present invention can be applied.

FIG. 9 is a flowchart showing an RRC connection reconfiguration procedure to which the present invention can be applied.

FIG. 10 is a view illustrating an example RRC connection reestablishment procedure to which the present invention may apply.

FIG. 11 is a flowchart showing a method of performing measurement to which the present invention can be applied.

FIG. 12 is a view illustrating an example heterogeneous network comprising a macro base station and a small base station to which the present invention may apply.

FIG. 13 shows an example of a wireless communication system for operating a small eNB to which the present invention can be applied.)

FIG. 14 is a concept view illustrating an example arrangement of a terminal and base stations in a heterogeneous network system to which the present invention may apply.

FIG. 15 illustrates Control Plane for Dual Connectivity in E-UTRAN.

FIG. 16 illustrates User Plane architecture for Dual Connectivity in E-UTRAN.

FIG. 17 illustrates architecture of radio interface protocol for Dual Connectivity between the E-UTRAN and a UE.

FIG. 18 illustrates Control plane architecture for Dual Connectivity in E-UTRAN.

FIG. 19 is a concept view illustrating an example heterogeneous network environment in which methods as proposed herein may be implemented.

FIG. 20 is a flowchart illustrating an example method of scaling a timer T310 as proposed herein.

FIG. 21 is a flowchart illustrating an example method of scaling timer T310 as proposed herein.

FIG. 22 is a flowchart illustrating an example method of recovering a scaled timer T310 as proposed herein.

FIG. 23 is a flowchart illustrating an example method of recovering a scaled timer T310 as proposed herein.

FIG. 24 is a block diagram illustrating the inside of a base station and a terminal in which methods as proposed herein may be implemented.

MODE FOR INVENTION

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments can be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

In the embodiments of the present invention, the enhanced Node B (eNode B or eNB) may be a terminal node of a network, which directly communicates with the terminal. In some cases, a specific operation described as performed by the eNB may be performed by an upper node of the eNB. Namely, it is apparent that, in a network comprised of a plurality of network nodes including an eNB, various operations performed for communication with a terminal may be performed by the eNB, or network nodes other than the eNB. The term 'eNB' may be replaced with the term 'fixed station' 'base station (BS)', 'Node B', 'base transceiver system (BTS),', 'access point (AP)', 'MeNB (Macro eNB)', 'SeNB (Secondary eNB)' etc. The term 'user equipment (UE)' may be replaced with the term 'terminal', 'mobile station (MS)', 'user terminal (UT)', 'mobile subscriber station (MSS)', 'subscriber station (SS)', 'Advanced Mobile Station (AMS)', 'Wireless terminal (WT)', 'Machine-Type Communication (MTC) device', 'Machine-to-Machine (M2M) device', 'Device-to-Device (D2D) device', wireless device, etc.

In the embodiments of the present invention, "downlink (DL)" refers to communication from the eNB to the UE, and "uplink (UL)" refers to communication from the UE to the eNB. In the downlink, transmitter may be a part of eNB, and receiver may be part of UE. In the uplink, transmitter may be a part of UE, and receiver may be part of eNB.

Specific terms used for the embodiments of the present invention are provided to aid in understanding of the present invention. These specific terms may be replaced with other terms within the scope and spirit of the present invention.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), 'non-orthogonal multiple access (NOMA)', etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE.

FIG. 1 is a view illustrating an Evolved Packet System which is associated with the Long Term Evolution (LTE) system to which the present invention can be applied. The LTE system aims to provide seamless Internet Protocol (IP) connectivity between a user equipment (UE, 10) and a pack data network (PDN), without any disruption to the end user's application during mobility. While the LTE system encompasses the evolution of the radio access through an E-UTRAN (Evolved Universal Terrestrial Radio Access Network) which defines a radio protocol architecture between a user equipment and a base station (20), it is accompanied by an evolution of the non-radio aspects under the term 'System Architecture Evolution' (SAE) which includes an Evolved Packet Core (EPC) network. The LTE and SAE comprise the Evolved Packet System (EPS).

The EPS uses the concept of EPS bearers to route IP traffic from a gateway in the PDN to the UE. A bearer is an IP packet flow with a specific Quality of Service (QoS) between the gateway and the UE. The E-UTRAN and EPC together set up and release the bearers as required by applications.

The EPC, which is also referred to as the core network (CN), controls the UE and manages establishment of the bearers. As depicted in FIG. 1, the node (logical or physical) of the EPC in the SAE includes a Mobility Management Entity (MME) 30, a PDN gateway (PDN-GW or P-GW) 50, a Serving Gateway (S-GW) 40, a Policy and Charging Rules Function (PCRF) 40, a Home subscriber Server (HSS) 70, etc.

The MME 30 is the control node which processes the signaling between the UE and the CN. The protocols running between the UE and the CN are known as the Non-Access Stratum (NAS) protocols. Examples of functions supported by the MME 30 includes functions related to bearer management, which includes the establishment, maintenance and release of the bearers and is handled by the session management layer in the NAS protocol, and functions related to connection management, which includes the establishment of the connection and security between the network and UE, and is handled by the connection or mobility management layer in the NAS protocol layer.

The S-GW 40 serves as the local mobility anchor for the data bearers when the UE moves between eNodeBs. All user IP packets are transferred through the S-GW 40. The S-GW 40 also retains information about the bearers when the UE is in idle state (known as ECM-IDLE) and temporarily buffers downlink data while the MME initiates paging of the UE to re-establish the bearers. Further, it also serves as the mobility anchor for inter-working with other 3GPP technologies such as GPRS (General Packet Radio Service) and UMTS (Universal Mobile Telecommunications System).

The P-GW 50 serves to perform IP address allocation for the UE, as well as QoS enforcement and flow-based charging according to rules from the PCRF 60. The P-GW 50 performs QoS enforcement for Guaranteed Bit Rate (GBR) bearers. It also serves as the mobility anchor for inter-working with non-3GPP technologies such as CDMA2000 and WiMAX networks.

The PCRF 60 serves to perform policy control decision-making, as well as for controlling the flow-based charging functionalities.

The HSS 70, which is also referred to as a Home Location Register (HLR), contains users' SAE subscription data such as the EPS-subscribed QoS profile and any access restrictions for roaming. Further, it also holds information about the PDNs to which the user can connect. This can be in the form of an Access Point Name (APN), which is a label according to DNS (Domain Name system) naming conventions describing the access point to the PDN, or a PDN Address which indicates subscribed IP addresses.

Between the EPS network elements shown in FIG. 1, various interfaces such as an S1-U, S1-MME, S5/S8, S11, S6a, Gx, Rx and SGi are defined.

Hereinafter, the concept of mobility management (MM) and a mobility management (MM) back-off timer is explained in detail. The mobility management is a procedure to reduce the overhead in the E-UTRAN and processing in the UE. When the mobility management is performed, all UE-related information in the access network can be released during periods of data inactivity. This state can be referred to as EPS Connection Management IDLE (ECM-IDLE). The MME retains the UE context and the information about the established bearers during the idle periods.

To allow the network to contact a UE in the ECM-IDLE, the UE updates the network as to its new location whenever it moves out of its current Tracking Area (TA). This procedure is called a 'Tracking Area Update', and a similar procedure is also defined in a universal terrestrial radio access network (UTRAN) or GSM EDGE Radio Access Network (GERAN) system and is called a 'Routing Area Update'. The MME serves to keep track of the user location while the UE is in the ECM-IDLE state.

When there is a need to deliver downlink data to the UE in the ECM-IDLE state, the MME transmits the paging message to all base stations (i.e., eNodeBs) in its current tracking area (TA). Thereafter, eNBs start to page the UE over the radio interface. On receipt of a paging message, the UE performs a certain procedure which results in changing the UE to ECM-CONNECTED state. This procedure is called a 'Service Request Procedure'. UE-related information is thereby created in the E-UTRAN, and the bearers are re-established. The MME is responsible for the re-establishment of the radio bearers and updating the UE context in the eNodeB.

When the above-explained mobility management (MM) is applied, a mobility management (MM) back-off timer can be further used. In particular, the UE may transmit a Tracking Area Update (TAU) to update the TA, and the MME may reject the TAU request due to core network congestion, with a time value associated with the MM back-off timer. Upon receipt of the time value, the UE may activate the MM back-off timer.

FIG. 2 illustrates a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC), more specifically, to a mobility management entity (MME) through S1-MME and to a serving gateway (S-GW) through S1-U.

The EPC includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 3 illustrates a functional split of an E-UTRAN and an EPC to which the present invention can be applied.

Referring to the FIG. 3, the eNB may perform functions of selection for the gateway (for example, MME), routing toward the gateway during a radio resource control (RRC) activation, scheduling and transmitting of paging messages, scheduling and transmitting of broadcast channel (BCH) information, dynamic allocation of resources to the UEs in both uplink and downlink, configuration and provisioning of eNB measurements, radio bearer control, radio admission control (RAC), and connection mobility control in LTE_ACTIVE state. In the EPC, and as mentioned above, the gateway may perform functions of paging origination, LTE_IDLE state management, ciphering of the user plane, System Architecture Evolution (SAE) bearer control, and ciphering and integrity protection of NAS signaling.

FIG. 4A is a diagram illustrating a radio protocol architecture for a user plane. FIG. 4B is a diagram illustrating a radio protocol architecture for a control plane. The user plane is a protocol stack for user data transmission. The control plane is a protocol stack for control signal transmission.

Referring to FIGS. 4A and 4B, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data are transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., PHY layer) and the second layer (i.e., MAC layer, RLC layer, and PDCP layer) for data delivery between the UE and the network.

The configuration of the RB implies a process for specifying a radio protocol layer and channel properties to provide a specific service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection exists between an RRC layer of the UE and an RRC layer of the network, the UE is in an RRC connected state, and otherwise the UE is in an RRC idle state.

Data are transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several symbols in a time domain and several sub-carriers in a frequency domain. One sub-frame includes a plurality of symbols in the time domain. One subframe includes a plurality of resource blocks. One resource block includes a plurality of symbols and a plurality of sub-carriers. Further, each subframe may use specific sub-carriers of specific symbols (e.g., a first symbol) of a corresponding subframe for a physical downlink control channel (PDCCH), i.e., an L1/L2 control channel. A transmission time interval (TTI) is a unit time of data transmission, and is 1 millisecond (ms) which corresponds to one subframe.

FIG. 5 illustrates a structure of a physical channel to which the present invention can be applied.

The subframe includes two slots in a time domain. A maximum of three OFDM symbols located in a front portion of a 1st slot in a subframe correspond to a control region to be assigned with control channels. The remaining OFDM symbols correspond to a data region to be assigned with physical downlink shared channels (PDSCHs).

Examples of downlink control channels used in the 3GPP LTE include a physical control format indicator channel (PCFICH), a physical downlink control channel (PDCCH), a physical hybrid-ARQ indicator channel (PHICH), etc. The PCFICH transmitted in a 1st OFDM symbol of a subframe carries information regarding the number of OFDM symbols (i.e., a size of a control region) used for transmission of control channels in the subframe. Control information transmitted over the PDCCH is referred to as downlink control information (DCI). The DCI transmits uplink resource assignment information, downlink resource assignment information, an uplink transmit power control (TPC) command for any UE groups, etc. The PHICH carries an acknowledgement (ACK)/not-acknowledgement (NACK) signal for an uplink hybrid automatic repeat request (HARQ). That is, the ACK/NACK signal for uplink data transmitted by a UE is transmitted over the PHICH.

FIG. 6 is a diagram for an operation process between a terminal and a base station in a contention based random access procedure.

(1) First Message Transmission

First of all, a terminal randomly selects one random access preamble from a set of random access preambles indicated by system information or a handover command. The terminal selects a PRACH (physical RACH) resource capable of carrying the random access preamble and is then able to transmit the corresponding random access preamble [S610].

(2) Second Message Reception

A method of receiving random access response is similar to the aforesaid non-contention based random access procedure. In particular, after the terminal has transmitted the random access preamble, as shown in the step S501, the terminal attempts a reception of its random access response on PDCCH within a random access response receiving window instructed by the system information or the handover command of a base station. The terminal then receives PDSCH via corresponding RA-RNTI information [S620]. Through the received PDSCH, the terminal is able to receive uplink grant (UL grant), temporary cell identifier (temporary C-RNTI), time synchronization correction value (timing advance command: TAC) and the like.

(3) Third Message Transmission

If the terminal receives a random access response valid to itself, the terminal processes informations contained in the random access response. In particular, the terminal applies the TAC and stores the temporary C-RNTI. The terminal also transmits data (i.e., a third message) to the base station using the UL grant [S630]. In this case, it is preferable that the third message contains an identifier of the terminal since a base station is unable to determine which terminal performs the random access procedure in the contention based random access procedure when the third message does not contains the identifier of the terminal. Thus it is preferable to identify a terminals for a future contention resolution.

Two kinds of methods have been discussed as a method of having a terminal identifier included. In a first method, if a terminal has a valid cell identifier assigned in a corresponding cell prior to the random access procedure, the terminal transmits its cell identifier via an uplink transmission signal corresponding to the UL grant. If the valid cell identifier is not assigned prior to the random access procedure, the terminal transmits its unique identifier (e.g., S-TMSI, a random ID, etc.). The unique identifier is generally longer than the cell identifier. If the terminal transmits data corresponding to the UL grant, the terminal initiates a timer for collision solution (contention resolution timer).

(4) Fourth Message Reception

After the terminal has transmitted the data containing its identifier using the UL grant contained in the random access response, the terminal waits for an instruction of the base station for the contention resolution. In particular, the terminal attempts a reception of PDCCH to receive a specific message [S640].

Two kinds of methods have been discussed as a method of receiving the PDCCH. As mentioned in the foregoing description, if the third message transmitted based on the UL grant is transmitted using it the cell identifier, the terminal attempts the reception of the PDCCH using its cell identifier. If the identifier is a unique identifier, the terminal is able to attempt the reception of the PDCCH using the temporary C-RNTI contained in the random access response.

Thereafter, in the former case, if the terminal received the PDCCH through its cell identifier before the contention resolution timer expires, the terminal determines that the random access procedure is successfully performed. The terminal then ends the random access procedure. In the latter case, if the terminal received the PDCCH via the temporary C-RNTI before the contention resolution timer expires, the terminal checks the data carried on the PDSCH instructed by the PDCCH. If the unique identifier of the terminal is included in the content of the data, the terminal determines that the random access procedure is successfully performed. The terminal then ends the random access procedure.

Hereinafter, an RRC state of a UE and an RRC connection will be disclosed.

The RRC state indicates whether an RRC layer of the UE is logically connected to an RRC layer of an E-UTRAN. If the two layers are connected to each other, it is called an RRC connected state, and if the two layers are not connected to each other, it is called an RRC idle state. When in the RRC connected state, the UE has an RRC connection and thus the E-UTRAN can recognize a presence of the UE in a cell unit. Accordingly, the UE can be effectively controlled. On the other hand, when in the RRC idle state, the UE cannot be recognized by the E-UTRAN, and is managed by a core network in a tracking area unit which is a unit of a wider area than a cell. That is, regarding the UE in the RRC idle state, only a presence or absence of the UE is recognized in a wide area unit. To get a typical mobile communication service such as voice or data, a transition to the RRC connected state is necessary.

When a user initially powers on the UE, the UE first searches for a proper cell and thereafter stays in the RRC idle state in the cell. Only when there is a need to establish an RRC connection, the UE staying in the RRC idle state establishes the RRC connection with the E-UTRAN through an RRC connection procedure and then transitions to the RRC connected state. Examples of a case where the UE in the RRC idle state needs to establish the RRC connection are various, such as a case where uplink data transmission is necessary due to telephony attempt of the user or the like or a case where a response message is transmitted in response to a paging message received from the E-UTRAN.

A non-access stratum (NAS) layer belongs to an upper layer of the RRC layer and serves to perform session management, mobility management, or the like.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a procedure of registering to the network through an initial attach procedure. If the attach procedure is successfully completed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When a UE in the ECM-IDLE state establishes an RRC connection with the E-UTRAN, the UE enters the ECM-CONNECTED state. When an MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Next, system information will be disclosed.

The system information includes essential information that needs to be known to a UE to access a BS. Thus, the UE has to receive all system information before accessing the BS. Further, the UE always has to have the latest system information. Since the system information is information that must be known to all UEs in one cell, the BS periodically transmits the system information.

According to the section 5.2.2 of 3GPP TS 36.331 V8.7.0 (2009-09) 'Radio Resource Control (RRC); Protocol specification (Release 8)', the system information is classified into a master information block (MIB), a scheduled block (SB), and a system information block (SIB). The MIB allows the UE to know a physical configuration (e.g., bandwidth) of a specific cell. The SB reports transmission information (e.g., a transmission period or the like) of SIBs. The SIB is a group of a plurality of pieces of system information related to each other. For example, an SIB includes only information of a neighboring cell, and another SIB includes only information of an uplink radio channel used by the UE.

In general, a service provided by the network to the UE can be classified into three types to be described below. Further, according to which service can be provided, the UE recognizes a cell type differently. A service type will be first described below, and then the cell type will be described.

1) Limited service: This service provides an emergency call and an earthquake and tsunami warning system (ETWS), and can be provided in an acceptable cell.

2) Normal service: This service denotes a public use service for general use, and can be provided in a suitable or normal cell.

3) Operator service: This service denotes a service for a network service provider, and a cell can be used only by the network service provider and cannot be used by a normal user.

A service type provided by a cell can be identified as follows.

1) Acceptable cell: A UE can receive a limited service in this cell. This cell is not barred from the perspective of the UE, and satisfies a cell selection criterion of the UE.

2) Suitable cell: The UE can receive a regular service in this cell. This cell satisfies a condition of an acceptable cell, and also satisfies additional conditions. Regarding the additional conditions, this cell has to belong to a PLMN to which the UE can access, and a tracking area update procedure of the UE must not be barred in this cell. If a specific cell is a CSG cell, this cell must be accessible by the UE as a CSG member.

3) Barred cell: Information indicating that a cell is a barred cell is broadcast in this cell by using system information.

4) Reserved cell: Information indicating that a cell is a reserved cell is broadcast in this cell by using system information.

FIG. 7 is a flowchart showing an operation of a UE in RRC_IDLE state to which the present invention can be applied. It is illustrated in FIG. 7 that a procedure of registering a PLMN through a cell selection and performing a cell reselection if needed after the UE is initially turned on.

Referring the FIG. 7, the UE selects a RAT for communicating with a PLMN from which the UE intends to be served (step S710). Information about the PLMN and the RAT may be selected by a user of the UE. The user may use the information stored in a Universal Subscriber Identity Module (USIM).

A UE selects a highest cell among a measured BS and cells having higher quality than a predetermined value (step S720). This procedure is referred as an initial cell reselection, and performed by a UE turned on. The cell selection procedure will be described in the following. After the cell selection, the UE periodically receives system information from the BS. The predetermined value is a value defined in a communication system for ensuring a physical signal quality in data transmission/reception. Therefore, the predetermined value may vary with a RAT to which the each predetermined value is applied.

The UE performs a network registration if needed (step S730). The UE registers self information (i.e. IMSI) for being served by the network (i.e. paging). The UE does not register whenever the UE selects a cell. When the UE's own information about the network is different from information about the network provided from the system information, the UE performs the network registration procedure.

The UE performs cell reselection based on a service environment or the UE's environment provided from the cell (S740). The UE, when the strength or quality value of a signal, which has been measured from the base station from which the UE is serviced, is lower that a value measured from the base station of a neighbor cell, selects one of other cells providing a better signal characteristic than the base station to which the UE is linked. This process is referred to as cell reselection as distinguished from the initial cell selection of the No. 2 process. At this time, a temporal restricting condition is assigned to prevent cells from being frequently reselected as the signal characteristics vary. The cell reselection procedure is to be described below in detail.

FIG. 8 is a flowchart showing an RRC connection establishment procedure to which the present invention can be applied.

A UE sends to a network an RRC connection request message for requesting an RRC connection (step S810). The network sends an RRC connection setup message in response to the RRC connection request (step S820). After receiving the RRC connection setup message, the UE enters an RRC connection mode.

The UE sends to the network an RRC connection setup complete message used to confirm successful completion of the RRC connection establishment (step S830).

FIG. 9 is a flowchart showing an RRC connection reconfiguration procedure. An RRC connection reconfiguration is used to modify an RRC connection. This is used to establish/modify/release an RB, to perform a handover, and to set up/modify/release a measurement.

A network sends to a UE an RRC connection reconfiguration message for modifying the RRC connection (step S910). In response to the RRC connection reconfiguration, the UE sends to the network an RRC connection reconfiguration complete message used to confirm successful completion of the RRC connection reconfiguration (step S920).

Next, a procedure for selecting a cell by the UE will be described in detail.

If the UE is turned on or is camped on a cell, the UE may perform procedures for selecting/reselecting a cell having suitable quality in order to receive a service.

The UE in an RRC idle state needs to be ready to receive the service through the cell by selecting the cell having suitable quality all the time. For example, the UE that has been just turned on must select the cell having suitable quality so as to be registered into a network. If the UE that has stayed in an RRC connected state enters into the RRC idle state, the UE must select a cell on which the UE itself is camped. As such, a process of selecting a cell satisfying a certain condition by the UE in order to stay in a service waiting state such as the RRC idle state is called a cell selection. The cell selection is performed in a state that the UE does not currently determine a cell on which the UE itself is camped in the RRC idle state, and thus it is very important to select the cell as quickly as possible. Therefore, if a cell provides radio signal quality greater than or equal to a predetermined level, the cell may be selected in the cell selection process of the UE even though the cell is not a cell providing best radio signal quality.

Hereinafter, by referring to the 3GPP TS 36.304 V8.5.0 (2009-03) 'User Equipment (UE) procedures in idle mode (Release 8)', a method and procedure for selecting a cell by a UE in 3GPP LTE will be described in detail.

If power is initially turned on, the UE searches for available PLMNs and selects a suitable PLMN to receive a service. Subsequently, the UE selects a cell having a signal quality and property capable of receiving a suitable service among the cells provided by the selected PLMN.

The cell selection process can be classified into two processes.

One process is an initial cell selection process, and in this process, the UE does not have previous information on radio channels. Therefore, the UE searches for all radio channels to find a suitable cell. In each channel, the UE searches for the strongest cell. Subsequently, if a suitable cell satisfying cell selection criteria is found, the UE selects the cell.

After the UE selects a certain cell through a cell selection process, the signal strength and quality between the UE and the BS may be changed due to the change of the UE mobility and wireless environment. Therefore, if the quality of the selected cell deteriorates, the UE may select another cell providing better quality. If a cell is reselected in this manner, a cell providing signal quality better than that of the currently selected cell is selected in general. This process is called a cell reselection. A basic purpose of the cell reselection process is generally to select a cell providing best quality to the UE from the perspective of the radio signal quality.

In addition to the perspective of the radio signal quality, the network may notify the UE of a priority determined for each frequency. The UE that has received the priority may consider this priority more preferentially than the radio signal quality criteria during the cell reselection process.

As described above, there is a method of selecting or reselecting a cell based on the signal property of the wireless environment. When a cell is selected for reselection in the cell reselection process, there may be cell reselection methods as described below, based on the RAT and frequency characteristics of the cell.

Intra-frequency cell reselection: A reselected cell is a cell having the same center-frequency and the same RAT as those used in a cell on which the UE is currently being camped.

Inter-frequency cell reselection: A reselected cell is a cell having the same RAT and a different center-frequency with respect to those used in the cell on which the UE is currently being camped.

Inter-RAT cell reselection: A reselected cell is a cell using a different RAT from a RAT used in the cell on which the UE is currently being camped.

The principles of the cell reselection process are as follows.

First, the UE measures quality of a serving cell and a neighboring cell for a cell reselection.

Second, the cell reselection is performed based on cell reselection criteria. The cell reselection criteria have following characteristics with regard to the measurement of serving cells and neighboring cells.

The intra-frequency cell reselection is basically based on ranking. The ranking is an operation for defining a criterion value for evaluation of the cell reselection and for ordering cells according to a magnitude of the criterion value by using the criterion value. A cell having the highest criterion is referred to as a best-ranked cell. The cell criterion value is a value to which a frequency offset or a cell offset is optionally applied on the basis of a value measured by the UE for a corresponding cell.

The inter-frequency cell reselection is based on a frequency priority provided by the network. The UE attempts to camp on at a frequency having a top priority. The network may provide the same frequency priority to be commonly applied to UEs in a cell by using broadcast signaling or may provide a frequency-specific priority to each UE by using dedicated signaling for each UE.

For the inter-frequency cell reselection, the network may provide parameters (e.g., frequency-specific offsets) for use in cell reselection to the UE for each frequency.

For the intra-frequency cell reselection or the inter-frequency cell reselection, the network may provide a neighboring cell list (NCL) for use in the cell reselection to the UE. The NCL includes cell-specific parameters (e.g. cell-specific offsets) used in the cell reselection.

For the intra-frequency or inter-frequency cell reselection, the network may provide the UE with a black list, i.e., a list of cells not to be selected in the cell reselection. The UE does not perform the cell reselection on cells included in the black list.

Hereinafter, RLM (Radio Link Monitoring) is described.

A UE monitors downlink quality based on a cell-specific reference signal in order to detect downlink radio link quality of a PCell.

The UE estimates downlink radio link quality for the purpose of monitoring the downlink radio link quality of the PCell and compares the estimated quality with thresholds Qout and Qin. The threshold Qout is defined as a level where stable reception through a downlink radio link is impossible, and this corresponds to a 10% block error rate of hypothetical PDCCH transmission considering PDFICH errors. The threshold Qin is defined as a downlink radio link quality level at which more stable reception may be made than at the threshold Qout, and this corresponds to a 2% block error rate of hypothetical PDCCH transmission considering PCFICH errors.

Hereinafter, radio link failure (RLF) is described.

A UE continues to perform measurement in order to maintain the quality a radio link with a serving cell receiving a service. The UE determines whether communication is impossible under current the current circumstance due to the quality of the radio link with the serving cell.

If the quality of the serving cell is too low and thus communication is nearly impossible, the UE determines the current circumstance as the radio link failure.

If the radio link failure is determined, the UE abandons maintaining communication with the current serving cell, selects a new cell through a cell selection (or cell reselection) procedure, and attempts an RRC connection reestablishment to the new cell.

The UE, if the following problems occur on the radio link, may determine that RLF has occurred.

(1) First, it may be determined that RLF has occurred due to a physical channel problem.

(2) It may be determined that RLF has occurred due to MAC random access problem

The UE, while performing the random access procedure at the MAC layer, goes through random access resource selection->random access preamble transmission->random access response reception->contention resolution. The above overall process is referred to as one random access procedure, and unless this procedure is successfully done, a next random access procedure is carried out after wait as long as a backoff time. If such random access procedure is unsuccessful despite a predetermined number of times (e.g., preambleTransMax) of attempts, this is informed to the RRC that then determines that RLF has occurred.

(3) It may be determined that RLF has occurred due to RLC maximum retransmission problem.

The UE, in case AM (Acknowledged Mode) RLC is used by the RLC layer, retransmits an RLC PDU that was not successfully transmitted.

However, if despite a predetermined number of times (e.g., maxRetxThreshold) of attempts to retransmit to a specific AMD PDU the AM RLC fails to transmit, this is informed to the RRC, and the RRC determines that RLF has occurred.

The RRC determines the occurrence of RLF for the three reasons as above. If RLF occurs so, an RRC connection reestablishment is performed that is a procedure to reestablish RRC connection with the eNB.

The RRC connection reestablishment procedure that is performed when RLF occurs is as follows.

The UE, if determining that a serious problem has occurred in the RRC connection itself, performs an RRC connection reestablishment procedure in order to reestablish a connection with the eNB. The serious problem with the RRC connection may include the following: (1) radio link failure (RLF); (2) handover failure; (3) mobility from E-UTRA; (4) PDCP integrity check failure; and (5) RRC connection reconfiguration failure.

If one of the above problems occurs, the UE runs the timer T311 and initiates an RRC connection reestablishment procedure. During this procedure, the UE goes through a cell selection random access procedure and is thus linked to a new cell.

If discovering a proper cell through a cell selection procedure while the timer T311 is running, the UE stops the timer T311 and starts a random access procedure to a corresponding cell. However, if failing to discover a proper cell until the timer T311 expires, the UE determines it as RRC connection failure and shifts to RRC_IDLE mode.

The RRC connection reestablishment procedure is now described below in greater detail.

FIG. 10 is a view illustrating an example RRC connection reestablishment procedure to which the present invention may apply.

Referring to FIG. 10, the UE stops using all of the configured radio bearers except SRB 0 (Signaling Radio Bearer #0) and initializes various sub-layers of AS (Access Stratum) (S1010). Further, the UE sets up each sub-layer and physical layer as default configuration. During such procedure, the UE maintains the RRC connection state.

The UE performs a cell selection procedure for conducting an RRC connection reestablishment procedure (S1020). Although the UE maintains the RRC connection state during the RRC connection reestablishment procedure, the cell selection procedure may be performed like the cell selection procedure performed by the UE in the RRC idle mode.

After performing the cell selection procedure, the UE identifies the system information on a corresponding cell to determine whether the corresponding cell is a proper cell (S1030). In case the selected cell is determined to be a proper E-UTRAN cell, the UE sends an RRC connection reestablishment request message to the corresponding cell (S1040).

On the other hand, in case the cell selected through the cell selection procedure for performing the RRC connection reestablishment procedure is determined to be a cell using other RAT than the E-UTRAN, the UE stops the RRC connection reestablishment procedure and enters the RRC idle mode (S1050).

The UE may be implemented to finish identifying whether the cell is proper within a limited time through the cell selection procedure and reception of the system information on the selected cell. To that end, the UE may run a timer as the UE initiates the RRC connection reestablishment procedure. The timer, when the UE is determined to have selected a proper cell, may stop. In case the timer expires, the UE considers it as failure of the RRC connection reestablishment procedure and may enter the RRC idle mode. This timer is hereinafter referred to as a radio link failure timer. According to the LTE spec. TS 36.331, a timer denoted T311 may be utilized as the radio link failure timer. The UE may obtain configuration values of the timer from the system information of the serving cell.

When receiving the RRC connection reestablishment request message from the UE and accepting the request, the cell transmits an RRC connection reestablishment message to the UE.

When receiving the RRC connection reestablishment message from the cell, the UE reconfigures a PDCP sub-layer and an RLC sub-layer for SRB1. Further, the UE recalculates various key values relating to security configuration and reconfigures the PDCP sub-layer that is in charge of security with the newly calculated security key values.

By doing so, SRB 1 between the UE and the cell is opened, and RRC control messages may be communicated therebetween. The UE completes resuming SRB1 and sends to the cell an RRC connection reestablishment complete message indicating that the RRC connection reestablishment procedure has been complete (S1060).

On the contrary, unless the cell receives the RRC connection reestablishment request message from the UE and accepts the request, the cell transmits an RRC connection reestablishment reject message to the UE.

If the RRC connection reestablishment procedure is successfully done, the cell and the UE perform an RRC connection reestablishment procedure. By doing so, the UE recovers to the state before performing the RRC connection reestablishment procedure and maximally guarantees service continuity.

RLF reporting is now described.

The UE, if RLF occurs or handover failure occurs, reports such failure event to the network in order to support MRO (Mobility Robustness Optimization) of the network.

After RRC connection reestablishment, the UE may provide an RLF report to the eNB. The radio measurement included in the RLF report may be used as potential reasons of failure in order to identify coverage problems. Such information may be used to exclude such events from MRO evaluation regarding intra-LTE mobility connection failure and use such events as inputs for other algorithms.

In case the RRC connection reestablishment fails or the UE cannot perform the RRC connection reestablishment, the UE may generate a valid RLF report for the eNB after reconnection in idle mode. For such purpose, the UE may store the latest RLF or handover failure-related information and may indicate to the LTE cell that the RLF report is valid per subsequent RRC connection (re)establishment and handover until the RLF report is called in by the network or for 48 hours after the RLF or handover failure is detected.

The UE maintains the information during the state transition and RAT variation, and after returning to the LTE RAT, indicates again that the RLF report is valid.

The RLF report being valid in the RRC connection reestablishment procedure indicates that the UE has received interference such as connection failure and due to such failure the RLF report has not been yet transferred to the network. The RLF report from the UE contains the following information.

E-CGI of target for handover or the last cell (in the case of RLF) that has provided service to the UE. If the E-CGI has not been known, PCI and frequency information are instead used.

E-CGI of cell in which reestablishment attempt has been done

Upon the last handover initialization, as an example, when message 7 (RRC connection reestablishment) has been received by the UE, E-CGI of the cell that has provided service to the UE elapsed time from the last handover initialization to connection failure information indicating whether connection failure has come from RLF or handover failure radio measurements position of failure When receiving the RLF failure from the UE, the eNB may forward the report to the eNB that provided service to the UE before the reported connection failure. The radio measurements contained in the RLF report may be used to identify coverage issues as potential causes of the radio link failure. Such information may be used to exclude such events from the MRO evaluation of the intra-LTE mobility connection failure and resend the same to inputs in other algorithm.

The following description is related to measurement and measurement report.

It is necessary for a mobile communication system to support mobility of a UE. Therefore, the UE persistently measures quality of a serving cell providing a current service and quality of a neighboring cell. The UE reports a measurement result to a network at a proper time. The network provides optimal mobility to the UE by using a handover or the like.

To provide information which can be helpful for a network operation of a service provider in addition to the purpose of supporting the mobility, the UE may perform measurement with a specific purpose determined by the network, and may report the measurement result to the network. For example, the UE receives broadcast information of a specific cell determined by the network. The UE may report to a serving cell a cell identify (also referred to as a global cell identity) of the specific cell, location identification information indicating a location of the specific cell (e.g., a tracking area code), and/or other cell information (e.g., whether it is a member of a closed subscriber group (CSG) cell).

In a state of moving, if the UE determines that quality of a specific region is significantly bad, the UE may report a measurement result and location information on cells with bad quality to the network. The network may attempt to optimize the network on the basis of the measurement result reported from UEs which assist the network operation.

In a mobile communication system having a frequency reuse factor of 1, mobility is generally supported between different cells existing in the same frequency band. Therefore, in order to properly guarantee the UE mobility, the UE has to properly measure cell information and quality of neighboring cells having the same center frequency as a center frequency of a serving cell. Measurement on a cell having the same center frequency as the center frequency of the serving cell is referred to as intra-frequency measurement. The UE performs the intra-frequency measurement and reports a measurement result to the network, so as to achieve the purpose of the measurement result.

A mobile communication service provider may perform a network operation by using a plurality of frequency bands. If a service of a communication system is provided by using the plurality of frequency bands, optimal mobility can be guaranteed to the UE when the UE is able to properly measure cell information and quality of neighboring cells having a different center frequency from the center frequency of the serving cell. Measurement on a cell having the different center frequency from the center frequency of the serving cell is referred to as inter-frequency measurement. The UE has to be able to perform the inter-frequency measurement and report a measurement result to the network.

When the UE supports measurement on a heterogeneous network, measurement on a cell of the heterogeneous network may be performed according to a configuration of a BS. Such a measurement on the heterogeneous network is referred to as inter-radio access technology (RAT) measurement. For example, RAT may include a GMS EDGE radio access network (GERAN) and a UMTS terrestrial radio access network (UTRAN) conforming to the 3GPP standard, and may also include a CDMA 200 system conforming to the 3GPP2 standard.

FIG. 11 is a flowchart showing a method of performing measurement to which the present invention can be applied.

A UE receives measurement configuration information from a BS (step S1110). A message including the measurement configuration information is referred to as a measurement configuration message. The UE performs measurement based on the measurement configuration information (step S1120). If a measurement result satisfies a reporting condition included in the measurement configuration information, the UE reports the measurement result to the BS (step S1130). A message including the measurement result is referred to as a measurement report message.

The measurement configuration information may include the following information.

(1) Measurement object: The object is on which the UE performs the measurements. The measurement object includes at least one of an intra-frequency measurement object which is an object of intra-frequency measurement, an inter-frequency measurement object which is an object of inter-frequency measurement, and an inter-RAT measurement object which is an object of inter-RAT measurement. For example, the intra-frequency measurement object may indicate a neighboring cell having the same frequency as a frequency of a serving cell, the inter-frequency measurement object may indicate a neighboring cell having a different frequency from a frequency of the serving cell, and the inter-RAT measurement object may indicate a neighboring cell of a different RAT from an RAT of the serving cell.

(2) Reporting configuration: This includes a reporting criterion and a reporting format. The reporting criterion is used to trigger the UE to send a measurement report and can either be periodical or a single event description. The reporting format is a quantity that the UE includes in the measurement report and associated information (e.g. number of cells to report).

(3) Measurement identify: Each measurement identity links one measurement object with one reporting configuration. By configuring multiple measurement identities, it is possible to link more than one measurement object to the same reporting configuration, as well as to link more than one reporting configuration to the same measurement object. The measurement identity is used as a reference number in the measurement report. The measurement identify may be included in the measurement report to indicate a specific measurement object for which the measurement result is obtained and a specific reporting condition according to which the measurement report is triggered.

(4) Quantity configuration: One quantity configuration is configured per RAT type. The quantity configuration defines the measurement quantities and associated filtering used for all event evaluation and related reporting of that measurement type. One filter can be configured per measurement quantity.

(5) Measurement gaps: Measurement gaps are periods that the UE may use to perform measurements when downlink transmission and uplink transmission are not scheduled.

To perform a measurement procedure, the UE has a measurement object, a reporting configuration, and a measurement identity.

In 3GPP LTE, the BS can assign only one measurement object to the UE with respect to one frequency. Events for triggering measurement reporting shown in the table below are defined in the section 5.5.4 of 3GPP TS 36.331 V8.5.0 (2009-03) 'Evolved Universal Terrestrial Radio Access (E-UTRA) Radio Resource Control (RRC); Protocol specification (Release 8)'.

TABLE 1

| Event | Reporting Condition |
|---|---|
| Event A1 | Serving becomes better than threshold |
| Event A2 | Serving becomes worse than threshold |
| Event A3 | Neighbour becomes offset better than Serving |
| Event A4 | Neighbour becomes better than threshold |
| Event A5 | Serving becomes worse than threshold1 and neighbor becomes better than threshold2 |
| Event B1 | Inter RAT neighbour becomes better than threshold |
| Event B2 | Serving becomes worse than threshold1 and inter RAT neighbor becomes better than threshold2 |

If the measurement result of the UE satisfies the determined event, the UE transmits a measurement report message to the BS.)

The heterogeneous network (HeNet) is now described.

Macro cells alone are insufficient to meet the demand for increasing data services. Accordingly, data services may be operated in a small indoor/outdoor area using small cells such as micro cells, pico cells, femto cells, or radio relays.

Although the small cells are not limited to specific purposes, the pico cells may be typically used in communication shadow area that is not covered by macro cells alone or in a region that has high demand for data services, so-called hot spots or hot zones.

The femto cells may be typically used in indoor office or home. Further, the radio relays may back up coverage of the macro cells. As the heterogeneous network is configured, any shadow area for the data services may be removed, and data transmission speed may be increased.

Research on techniques regarding small cell enhancement (SCE) for small cells to cover a relatively very small area using less power as compared with existing macro cells is intensively underway in order to cover sharply increasing data traffic.

SCE means a technique for enabling efficient mobility management while covering increasing traffic by densely arranging small cells in macro cell coverage (or without macro cell coverage in the case of the inside of a building) and dramatically increasing spectrum efficiency per unit area through close cooperation between an MeNB operating a macro cell and an SeNB operating a small cell or between SeNBs.

In particular, in a certain region such as a so-called hot spot in the cell, there is a specially high communication demand, and in some regions such as cell edges or coverage holes, the reception of radio waves may be decreased, so that small cells may be utilized in the region with high demand for data services such as hot spots or communication shadow areas not covered by macro cells alone.

FIG. 12 is a view illustrating an example heterogeneous network comprising a macro base station and a small base station to which the present invention may apply.

In the heterogeneous network (HeNet), a macro base station and a small base station both are operated.

Here, the macro base station provides a radio communication environment to the UE in the macro cell, and the small base station is a base station, such as micro base stations, femto base stations, pico base stations, or relays, having a smaller size than the macro base station, and the small base station provides a radio communication environment to the UE in the small cell.

The macro base station may be referred to as a macro eNB (MeNB) or a primary eNB, and the small base station may be referred to as a small eNB, a secondary eNB (SeNB), a pico base station (Pico eNB), a femto eNB, a micro base station (Micro eNB), a remote radio head (RRH), a relay, or a repeater.

Further, the small cell, thanks to servicing in a small area as compared with the macro cell, is advantageous over the macro cell in light of throughput that may be offered to a single UE.

The base station as used herein is the concept including the macro base station, the small base station, and other types of base stations.

Hereinafter, for ease of description, the macro base station is denoted a 'first base station' or 'MeNB,' and the small base station is denoted a 'second base station' or 'SeNB.'

As shown in FIG. 12, the macro cell region and the small cell region may overlap each other or not in light of coverage. Further, a carrier frequency F1 supported by the MeNB and a carrier frequency supported by the SeNB may be the same as each other (in case the SeNB supports F1) or may be different from each other (in case the SeNB supports F2).

Further, back holes between the MeNB and the SeNB or between a plurality of SeNBs may support both ideal back holes and non-ideal back holes.

Further, dense and sparse small cell deployments both may be considered, and both indoor and outdoor small cell deployments may be taken into account.

The macro cell region and the small cell region shown in FIG. 12 are merely an example, and the number or size of the areas may be different from those shown therein.

FIG. 13 shows an example of a wireless communication system for operating a small eNB to which the present invention can be applied. Referring to FIG. 13, the small eNB (SeNB) gateway (SeNB GW) can be operated to provide a service to the SeNB as described above. SeNBs are connected to an EPC directly or via the SeNB GW. An MME regards the SeNB GW as a typical eNB. Further, the SeNB regards the SeNB GW as the MME. Therefore, the SeNB and the SeNB GW are connected by means of an S1 interface, and also the SeNB GW and the EPC are connected by means of the S1 interface. Furthermore, even in a case where the SeNB and the EPC are directly connected, they are connected by means of the S1 interface. A function of the SeNB is almost similar to a function of the typical eNB.

In general, the SeNB has radio transmission output power lower than that of an eNB owned by a mobile network vendor. Therefore, in general, the coverage provided by the SeNB is smaller than the coverage provided by the eNB. Due to such characteristics, a cell provided by the SeNB is often classified as a femto cell in contrast to a macro cell provided by the eNB from the perspective of the coverage.

FIG. 14 is a concept view illustrating an example arrangement of a UE and base stations in a heterogeneous network to which the present invention may apply.

Referring to FIG. 14, the heterogeneous network system includes a macro base station providing service using a frequency band 1 and a small base station providing service using frequency band 1 or 2.

The macro base station may provide service in the coverage of the macro cell using the frequency band 1, and the small base station may provide service in the coverage of the small cell using the frequency band 1 or frequency band 2.

The UE 10 may configure an RRC connection with the macro base station or small base station to receive service. For example, in case the UE 10 approaches the service coverage area of the small base station while configured for the RRC connection with the macro base station, the quality of radio signals received by the UE 10 may be more excellent in the frequency band 1 of the macro base station than in the frequency band 2 of the small base station.

In such case, the UE 10 may perform an inter-frequency handover procedure from the macro base station configured for RRC connection with the UE to the small base station in order to receive service from the small base station.

Further, in case the UE 10 departs from the service coverage area of the small base station or the quality of radio signals received by the UE 10 is more excellent in the frequency band 1 of the macro base station than in the frequency band 2 of the small base station, an inter-frequency handover procedure from the small base station to the macro base station may be conducted as well.

Hereinafter, the small cell deployment is described in greater detail with reference to FIGS. 15 to 18.

With and without Macro Coverage

Small cell enhancement considers both with and without macro coverage.

More specifically, Small cell enhancement is considered the deployment scenario in which small cell nodes are deployed under the coverage of one or more than one overlaid E-UTRAN macro-cell layer(s) in order to boost the capacity of already deployed cellular network.

Two scenarios can be considered in the deployment scenario with macro coverage, where the UE is in coverage of both the macro cell and the small cell simultaneously and where the UE is not in coverage of both the macro cell and the small cell simultaneously. Also, Small cell enhancement is considered the deployment scenario where small cell nodes are not deployed under the coverage of one or more overlaid E-UTRAN macro-cell layer(s).

Outdoor and Indoor

Small cell enhancement considers both outdoor and indoor small cell deployments. The small cell nodes could be deployed indoors or outdoors, and in either case could provide service to indoor or outdoor UEs. For indoor UE, only low UE speed (i.e., 0-3 km/h) can be considered. On the contrary, for outdoor, not only low UE speed, but also medium UE speed (i.e., up to 30 km/h and potentially higher speeds) should be considered.

Ideal and Non-Ideal Backhaul

Small cell enhancement considers both ideal backhaul (i.e., very high throughput and very low latency backhaul such as dedicated point-to-point connection using optical fiber) and non-ideal backhaul (i.e., typical backhaul widely used in the market such as xDSL, microwave, and other backhauls like relaying). The performance-cost trade-off should be taken into account.

Sparse and Dense

Small cell enhancement considers sparse and dense small cell deployments. In some scenarios (e.g., hotspot indoor/outdoor places, etc.), single or a few small cell node(s) are sparsely deployed, e.g., to cover the hotspot(s). Meanwhile, in some scenarios (e.g., dense urban, large shopping mall, etc.), a lot of small cell nodes are densely deployed to support huge traffic over a relatively wide area covered by the small cell nodes. The coverage of the small cell layer is generally discontinuous between different hotspot areas. Each hotspot area can be covered by a group of small cells, i.e. a small cell cluster.

Synchronization

Both synchronized and un-synchronized scenarios are considered between small cells as well as between small cells and macro cell(s). For specific operations e.g., interference coordination, carrier aggregation (CA) and inter-eNB COMP, small cell enhancement can benefit from synchronized deployments with respect to small cell search/measurements and interference/resource management.

Spectrum

Small cell enhancement addresses the deployment scenario in which different frequency bands are separately assigned to macro layer and small cell layer, respectively. Small cell enhancement can be applicable to all existing and as well as future cellular bands, with special focus on higher frequency bands, e.g., the 3.5 GHz band, to enjoy the more available spectrum and wider bandwidth. Small cell enhancement can also take into account the possibility for frequency bands that, at least locally, are only used for small cell deployments.

Co-channel deployment scenarios between macro layer and small cell layer should be considered as well. Some example spectrum configurations can be considered as follow.

Carrier aggregation on the macro layer with bands X and Y, and only band X on the small cell layer Small cells supporting carrier aggregation bands that are co-channel with the macro layer Small cells supporting carrier aggregation bands that are not co-channel with the macro layer.

Small cell enhancement should be supported irrespective of duplex schemes (FDD/TDD) for the frequency bands for macro layer and small cell layer. Air interface and solutions for small cell enhancement should be band-independent.

Traffic

In a small cell deployment, it is likely that the traffic is fluctuating greatly since the number of users per small cell node is typically not so large due to small coverage. In a small cell deployment, it is likely that the user distribution is very fluctuating between the small cell nodes. It is also expected that the traffic could be highly asymmetrical, either downlink or uplink centric. Thus, both uniform and non-uniform traffic load distribution in time-domain and spatial-domain are considered.

Dual Connectivity

In the heterogeneous networks which supports small cell enhancement, there are various requirements related to mobility robustness, increased signalling load due to frequent handover and improving per-user throughput and system capacity, etc.

As a solution to realize these requirements, E-UTRAN supports Dual Connectivity (DC) operation whereby a multiple RX/TX UE in RRC_CONNECTED is configured to utilize radio resources provided by two distinct schedulers, located in two eNBs connected via a non-ideal backhaul over the X2 interface.

The Dual connectivity may imply Control and Data separation where, for instance, the control signaling for mobility is provided via the macro cell at the same time as high-speed data connectivity is provided via the small cell. Also, a separation between downlink and uplink, the downlink and uplink connectivity is provided via different cells.

eNBs involved in dual connectivity for a certain UE may assume two different roles, i.e. an eNB may either act as an MeNB or as an SeNB. In dual connectivity a UE can be connected to one MeNB and one SeNB. MeNB is the eNB which terminates at least S1-MME in dual connectivity, and SeNB is the eNB that is providing additional radio resources for the UE but is not the Master eNB in dual connectivity.

In addition, DC with CA configured means mode of operation of a UE in RRC_CONNECTED, configured with a Master Cell Group and a Secondary Cell Group.

Here, "cell group" is a group of serving cells associated with either the Master eNB (MeNB) or the Secondary eNB (SeNB) in dual connectivity.

"Master Cell Group (MCG)" is a group of serving cells associated with the MeNB, comprising of the primary cell (PCell) and optionally one or more secondary cells (SCells) in dual connectivity. "Secondary Cell Group (SCG)" is a group of serving cells associated with the SeNB comprising of primary SCell (pSCell) and optionally one or more SCells.

Here, the "cell" described herein should be distinguished from a 'cell' as a general region covered by a eNB. That is, cell means combination of downlink and optionally uplink resources. The linking between the carrier frequency (i.e. center frequency of the cell) of the downlink resources and the carrier frequency of the uplink resources is indicated in the system information transmitted on the downlink resources.

MCG bearer is radio protocols only located in the MeNB to use MeNB resources only in dual connectivity, and SCG bearer is radio protocols only located in the SeNB to use SeNB resources in dual connectivity. And, Split bearer is radio protocols located in both the MeNB and the SeNB to use both MeNB and SeNB resources in dual connectivity.

FIG. 15 illustrates Control Plane for Dual Connectivity in E-UTRAN.

Inter-eNB control plane signalling for dual connectivity is performed by means of X2 interface signalling. Control plane signalling towards the MME is performed by means of S1 interface signalling. There is only one S1-MME connection per UE between the MeNB and the MME. Each eNB should be able to handle UEs independently, i.e. provide the PCell to some UEs while providing SCell(s) for SCG to others. Each eNB involved in dual connectivity for a certain UE owns its radio resources and is primarily responsible for allocating radio resources of its cells, respective coordination between MeNB and SeNB is performed by means of X2 interface signalling.

Referring to the FIG. 15, the MeNB is C-plane connected to the MME via S1-MME, the MeNB and the SeNB are interconnected via X2-C.

FIG. 16 illustrates User Plane architecture for Dual Connectivity in E-UTRAN.

FIG. 16 shows U-plane connectivity of eNBs involved in dual connectivity for a certain UE. U-plane connectivity depends on the bearer option configured as follow.

For MCG bearers, the MeNB is U-plane connected to the S-GW via S1-U, the SeNB is not involved in the transport of user plane data. For split bearers, the MeNB is U-plane connected to the S-GW via S1-U and in addition, the MeNB and the SeNB are interconnected via X2-U. Here, split bearer is radio protocols located in both the MeNB and the SeNB to use both MeNB and SeNB resources. For SCG bearers, the SeNB is directly connected with the S-GW via S1-U. Thus, if only MCG and split bearers are configured, there is no S1-U termination in the SeNB.

FIG. 17 illustrates architecture of radio interface protocol for Dual Connectivity between the E-UTRAN and a UE.

In Dual Connectivity, the radio protocol architecture that a particular bearer uses depends on how the bearer is setup. Three alternatives exist, MCG bearer, SCG bearer and split bearer. That is, some bearers (e.g., SCG bearers) of a UE may be served by the SeNB while others (e.g., MCG bearers) are only served by the MeNB. Also, some bearers (e.g., split bearers) of a UE may be split while others (e.g., MCG bearers) are only served by the MeNB. Those three alternatives are depicted on FIG. 17.

In case that MCG bearer and/or SCG bearer is setup, S1-U terminates the currently defined air-interface U-plane protocol stack completely per bearer at a given eNB, and is tailored to realize transmission of one EPS bearer by one node. The transmission of different bearers may still happen simultaneously from the MeNB and a SeNB In case that split bearer is setup, S1-U terminates in MeNB with the PDCP layer residing in the MeNB always. There is a separate and independent RLC bearer (SAP above RLC), also at UE side, per eNB configured to deliver PDCP PDUs of the PDCP bearer (SAP above PDCP), terminated at the MeNB. The PDCP layer provides PDCP PDU routing for transmission and PDCP PDU reordering for reception for split bearers in DC.

SRBs are always of the MCG bearer and therefore only use the radio resources provided by the MeNB. Here, DC can also be described as having at least one bearer configured to use radio resources provided by the SeNB.

FIG. 18 illustrates Control plane architecture for Dual Connectivity in E-UTRAN.

Each eNB should be able to handle UEs autonomously, i.e., provide the PCell to some UEs while acting as assisting eNB for other. It is assumed that there will be only one S1-MME Connection per UE.

In dual connectivity operation, the SeNB owns its radio resources and is primarily responsible for allocating radio resources of its cells. Thus, some coordination is still needed between MeNB and SeNB to enable this.

At least the following RRC functions are relevant when considering adding small cell layer to the UE for dual connectivity operation:

Small cell layer's common radio resource configurations
Small cell layer's dedicated radio resource configurations
Measurement and mobility control for small cell layer In dual connectivity operation, a UE always stays in a single RRC state, i.e., either RRC_CONNECTED or RRC_IDLE.

Referring the FIG. 18, only the MeNB generates the final RRC messages to be sent towards the UE after the coordination of RRM functions between MeNB and SeNB. The UE RRC entity sees all messages coming only from one entity (in the MeNB) and the UE only replies back to that entity. L2 transport of these messages depends on the chosen UP architecture and the intended solution.

The following general principles are applied for the operation of dual connectivity.

1. The MeNB maintains the RRM measurement configuration of the UE and may, e.g, based on received measurement reports or traffic conditions or bearer types, decide to ask an SeNB to provide additional resources (serving cells) for a UE.

2. Upon receiving the request from the MeNB, an SeNB may create the container that will result in the configuration of additional serving cells for the UE (or decide that it has no resource available to do so).

3. The MeNB and the SeNB exchange information about UE configuration by means of RRC containers (inter-node messages) carried in Xn messages. Here, the Xn interface can be a X2 interface in LTE/LTE-A system.

4. The SeNB may initiate a reconfiguration of its existing serving cells (e.g., PUCCH towards the SeNB).

5. The MeNB does not change the content of the RRC configuration provided by the SeNB.

Hereinafter, an RLF (Radio Link Failure)-related timer scaling method and scaled RLF (Radio Link Failure)-related timer restoring method as suggested herein are described in detail with reference to FIGS. 19 to 23.

In other words, the present disclosure provides a method for prohibiting handover from a macro cell to a small cell and preventing an RLF-related timer from expiring until a UE moving at fast speed passes through the small cell region.

Here, the RLF-related timer, in case a problem with a physical channel occurs, may mean a timer running in the RRC. An example of the RLF-related timer may be the timer T310. In such case, the timer T310 value may be set as ms1000.

However, without limited thereto, the RLF-related timer may mean any one among the timers (T300 through T312, T320, T321, T325, T330, T340) set forth in 3GPP TS 36.331 V12.1.0, Ch. 7.3.

Hereinafter, for ease of description, the 'timer T310' is described as an example of the RLF-related timer.

FIG. 19 is a concept view illustrating an example heterogeneous network in which the methods proposed herein may be implemented.

Referring to FIG. 19, the UE passes through the small cell region at quick speed in the cell deployment environment (i.e., the environment in which the small cell region is included in the macro cell region) where the macro cell region (coverage) overlaps the small cell region.

Here, one small cell is preferably present in the macro cell region. However, multiple small cells may be present in the macro cell region, and in such case, the multiple small cells are preferably arranged sparsely.

As set forth above, the small cell may be all other types of cells than the macro cell, as a cell smaller in size than the macro cell, such as the pico cell, CSG (Closed Subscriber Group) cell, micro cell, or relay.

Further, the small cell may also mean a cell arranged for the purpose of data offloading of the macro cell, a cell indicated by the macro cell in order for the UE to perform measurement independently from legacy measurement, a cell using a new type of carrier, or a cell that is previously known as the small cell (through a list of small cell IDs transmitted to the UE).

Referring to FIG. 19, the UE, when or after entering the macro cell region (1910), may previously receive information relating to the scaling and restoring of the timer T310 through the network.

Thereafter, in case the UE is positioned near the small cell (1920), the UE may scale the timer T310.

Then, the UE may pass through the small cell (1930) and restore the scaled timer T310 to the original timer T310.

First, the timer T310 scaling method is described.

FIG. 20 is a flowchart illustrating an example timer T310 scaling method as proposed herein.

The UE, when a certain condition is met, scales the configured timer T310 (S2010, S2020). Here, the certain condition may be represented as a timer scaling condition.

The UE is on the move. The UE may travel more quickly than a threshold speed or may be on the quicker move than a threshold mobility state.

In other words, the UE does not require a handover procedure to a specific cell thanks to the high moving speed. Here, the specific cell may mean a small cell such as a pico cell, a micro cell, or a femto cell.

Further, the threshold speed and the threshold mobility state may be transmitted from the network to the UE or may be pre-known values as values pre-owned by the UE.

The certain condition, i.e., timer scaling condition, may include the following conditions 1 to 8:

The condition of triggering measurement reporting for a certain target cell is met and the target cell type is small cell The condition of triggering measurement reporting for a certain target cell is met and the target cell is listed in blacklist The trigger condition of measurement reporting for a certain target cell is met and the target cell is a cell forbidden to send the measurement report by network The UE detects that it enters proximity of small cell The UE detects that it enters proximity of cell which is forbidden to send the measurement report by network The UE detects a small cell The UE detects a neighboring cell around which UE applies scaling of T310

Network may signals the list of those neighbouring cells

The UE detects a neighbouring cell around which UE applies scaling of T310 and the measured quality of the cell is above threshold Likewise, the network may apply the scaling of the timer T310 and may previously send to the UE a list of neighbor cells with measured cell qualities equal to or higher than the threshold value.

A specific method of the UE scaling the configured timer T310 is to multiply or add a scaling factor to the configured timer T310 to thus scale the configured timer T310.

As another example of scaling the timer T310 is a method by which the UE uses a scaled timer T310' value instead of the configured timer T310 value when the timer scaling condition is met. The UE previously retains the scaled timer T310' value through the network.

In such case, the UE, when the timer scaling condition is met, may use the scaled timer T310' without scaling the configured timer T310.

Here, the scaled timer T310' value is preferably applied with a larger value than the configured timer T310 value, i.e., the original timer T310 value.

Further, the scaling factor may be used considering the UE's speed, the size of the cell (macro cell) in which the UE is presently positioned, and the size of the cell (small cell) to which the UE intends to move.

There may be multiple scaling factors that may be transmitted to the UE through the network in the format of a mapping table or that may be pre-retained by the UE.

In such case, the UE may perform scaling on the timer T310 by selecting a proper scaling factor considering the UE's mobility, size of the macro cell, and size of the small cell before satisfying the timer scaling condition to scale the timer T310.

Thereafter, the UE, when entering the small cell, drives the scaled timer T310 (S2030).

Here, the driven timer T310 does not expire until the UE passes through the small cell, and resultantly, the UE does not declare RLF due to physical channel problems.

FIG. 21 is a flowchart illustrating an example timer T310 scaling method as proposed herein.

Assume that the UE is on the move in the macro cell region. Here, the UE performs handover to the macro cell region and may thus be in RRC idle mode or RRC connected mode (S2110). Further, the UE is assumed to have a fast moving speed equal to or higher than the threshold.

The UE having mobility continues to measure the quality on a neighbor cell of the macro cell currently providing service, i.e., a small cell (S2120). This is for supporting the UE's mobility.

Here, the information on the small cell that should be supposed to quality measurement may be transmitted from the network when the UE approaches a nearby area of the small cell or may be pre-transmitted from the network when the UE enters the macro cell.

The UE reports a result of the quality measurement to the network at a proper time (S2120), and the network provides the optimum mobility to the UE.

Here, the network providing the optimum mobility to the UE may include prohibiting the UE from performing a handover procedure to the small cell and enable the timer T310 to be scaled.

Accordingly, the macro cell may configure multiple timer T310 scaling factors (S2130), and the multiple configured timer T310 scaling factors may be transmitted to the UE (S2140).

Thereafter, the macro cell sends a small cell list to the UE. Here, the small cell list may include small cells positioned around the macro cell or small cells to which the UE is predicted to move.

Here, the network may send the multiple timer T310 scaling factors, together with the small cell list, to the UE.

Then, the UE, when detecting to be positioned near a small cell included in the received list, selects a timer T310 scaling factor corresponding to the UE's speed (S2150).

Subsequently, the UE scales the originally configured timer T310 value to a larger value by multiplying the selected timer T310 scaling factor to the originally configured timer T310 (S2150).

The UE then runs the scaled timer T310 (S2160).

Running the scaled timer T310 may be the case where the following situation may occur while the UE enters the small cell.

That is, when the quality of an RS (Reference Signal) periodically received from the MeNB on the physical channel is the threshold or less, the UE may determine that an out-of-sync has occurred on the physical channel. If such out-of-sync occurs consecutively by a certain number of times (e.g., N310), the physical layer informs this to the RRC. When receiving the out-of-sync message from the physical layer, the RRC runs the timer T310.

In case the UE fails to pass through the small cell until the timer T310 expires, the UE declares RLF and performs an RRC connection reestablishment procedure with the macro base station.

Next, a scaled timer T310 restoring method is described in detail. FIG. 22 is a flowchart illustrating an example scaled timer T310 restoring method as proposed herein.

The UE, when satisfying a scaled timer restoring condition (S2210), restores (or changes, switches, sets up, or recovers) the scaled timer T310 to the original (unscaled, configured) timer T310 (S2220).

Here, the scaled timer restoring condition means a condition for restoring the scaled timer to the original timer and may include the following conditions 1 to 3:

1. T310 scaling timer expires
2. The condition that previously triggered the T310 scaling is no longer met
   For example, the UE leaves the proximity of the cell which triggered T310 scaling
3. The measured RSRP or RSRQ of the target cell which triggered T310 scaling becomes lower than a threshold value The T310 scaling factor, the T310 scaling timer and the RSRP/RSRQ threshold value can be configured by network)

FIG. 23 is a flowchart illustrating an example scaled timer T310 restoring method as proposed herein.

Steps S2310 to S2360 in FIG. 23 are the same as steps S2110 to S2160 in FIG. 21, and thus, detailed description thereof is omitted.

Thereafter, the UE, when failing to satisfy the timer scaling conditions described above in connection with FIG. 20 or satisfying any one among the scaled timer restoring conditions described above in connection with FIG. 22 (e.g., in the case of leaving the listed small cells (or a place near the small cell), restores the scaled timer T310 to the original timer T310 (S2370, S2380).

FIG. 24 is a block diagram illustrating a wireless device in which methods as proposed herein may be implemented.

Here, the wireless device may be a base station and a UE, and the base station includes both a macro base station and a small base station.

As shown in FIG. 24, the base station 2410 and the UE 2420 include communication units (transmitting/receiving units, RF units, 2413 and 2423), processors 2411 and 2421, and memories 2412 and 2422.

The base station and the UE may further input units and output units.

The communication units 2413 and 2423, the processors 2411 and 2421, the input units, the output units, and the memories 2412 and 2422 are operatively connected with each other in order to conduct the methods as proposed herein.

The communication units (transmitting/receiving units or RF units, 2413 and 2423), when receiving information created from a PHY (Physical Layer) protocol, transfer the received information through RF (Radio Frequency) spectrums and conduct filtering and amplification, then transmit the results through antennas. Further, the communication units transfer RF (Radio Frequency) signals received through the antennas to bands processable by the PHY protocol and perform filtering.

However, the communication units may also include the functions of switches to switch transmitting and receiving functions.

The processors 2411 and 2421 implement functions, procedures, and/or methods as proposed herein. The layers of radio interface protocols may be implemented by the processors.

The processors may be represented as control parts, controllers, control units, or computers.

That is, the processors measure the quality of the serving cells using reference signals (RSs) received from a serving base station, identify whether the out-of-sync occurs consecutively by a predetermined number of times on the physical channel of the UE, and in case the result of the identification shows that the out-of-sync occurs consecutively by such a predetermined number of times, perform control to drive the RLF-related timer.

Further, the processors control the communication units to receive multiple scaling factors from the network and conduct control to select any one of the multiple received scaling factors.

The memories 2412 and 2422 are connected with the processors and store protocols or parameters for performing the restoring of the scaled timer T310.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a base-band circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

The output unit (display unit) is controlled by the processor and outputs information from the process, together with various information signals from the processor and key input signals generated from the key input unit.

Further, although the drawings have been individually described for ease of description, the embodiments shown in the drawings may be merged with each other to implement new embodiments. As necessary by one of ordinary skill, designing recording media readably by a computer recording programs to execute the above-described embodiments also belongs to the scope of the present invention.

The timer T310 scaling and scaled timer T310 restoring methods according to this disclosure, rather than limited to the configurations and methods according to the above-described embodiments, may be configured so that all or some of the embodiments may be selectively combined with each other to allow for various variations or modifications.

Meanwhile, the timer T310 scaling and scaled timer T310 restoring methods according to this disclosure may be implemented as codes that are readable by a recording medium readable by a process provided in a network device. The process readable recording media include all types of recording devices storing data that is readable by the processor. Examples of the recording media readable by the process include ROMs, RAMs, CD-ROMs, magnetic tapes, floppy discs, optical data storage devices, etc., and may be further implemented in the form of carrier waves such as transmitted over the Internet.

Further, the recording media readable by the processor may be distributed to computer systems connected with each other via a network, and processor readable codes may be stored and executed in a distributing manner.

INDUSTRIAL APPLICABILITY

The disclosure is directed to use of operations relating to radio link failure (RLF) in a heterogeneous network.

The invention claimed is:

1. A method for scaling a measurement related parameter in a wireless communication system, the method performed by a terminal and comprising:
   receiving, from a network, one or more scaling factors used for scaling the measurement related parameter;
   determining whether to scale the measurement related parameter based on a mobility state of the terminal;

determining a specific scaling factor corresponding to the mobility state of the terminal, among the received one or more scaling factors, when the mobility state of the terminal is higher than a threshold mobility state; and scaling the measurement related parameter by multiplying the determined scaling factor with the measurement related parameter.

2. The method of claim 1, wherein the measurement related parameter is a timer related to a radio link failure (RLF).

3. The method of claim 2, wherein the timer related to the radio link failure (RLF) is a timer T310.

4. The method of claim 3, wherein a scaling condition of the timer related to the radio link failure (RLF) occurs, when a measurement report triggering condition for a specific target cell is met and the specific target cell is a small cell, when a measurement report triggering condition for the specific target cell is met and the specific target cell is included in a black list, when a measurement report triggering condition for the specific target cell is met and the specific target cell is prohibited from transmitting a measurement report by a network, when the terminal is within proximity of a small cell, when the terminal detects a small cell, when the terminal detects a neighboring cell, in proximity, that should apply scaling to a timer T310 , or when the terminal detects a neighbor cell that should apply scaling to the timer T310 and the quality of a measured cell is not less than a threshold.

5. The method of claim 3, further comprising:

restoring the timer related to the RLF when a timer restoring condition is met.

6. The method of claim 5, wherein the timer restoring condition occurs, when the timer related to the RLF expires, when a timer scaling condition is no longer met, or when a measured RSRP (Reference Signal Received Power)/RSRQ (Reference Signal Received Quality) of a target cell is triggered so that the timer is scaled to be lower than a threshold.

7. The method of claim 1, wherein the network includes a serving cell.

8. A terminal for scaling a measurement related parameter in a wireless communication network, the terminal comprising:

a base-band circuit for receiving and transmitting a radio signal; and a processor, operationally coupled with the base-band circuit, that:

receives, from a network, one or more scaling factors used for scaling the measurement related parameter;

determines whether to scale the measurement related parameter based on a mobility state of the terminal;

determines a scaling factor corresponding to the mobility state of the terminal, among the received one or more scaling factors, when the mobility state of the terminal is higher than a threshold mobility state; and scales the measurement related parameter by multiplying the determined scaling factor with the measurement related parameter.

9. The terminal of claim 8, wherein the measurement related parameter is a timer related to the radio link failure (RLF).

* * * * *